United States Patent [19]

Kino et al.

[11] Patent Number: 4,991,923
[45] Date of Patent: Feb. 12, 1991

[54] ACOUSTO-OPTIC MODULATOR FOR OPTICAL FIBERS USING HERTZIAN CONTACT WITH A GROOVED TRANSDUCER SUBSTRATE

[75] Inventors: Gordon S. Kino; Guo C. Wa, both of Stanford; Butrus T. Khuri-Yakub, Palo Alto; David B. Patterson, Stanford; Asif A. Godil, Palo Alto, all of Calif.

[73] Assignee: Board of Trustees of the Leland Stanford Junior University, Stanford, Calif.

[21] Appl. No.: 298,177

[22] Filed: Jan. 17, 1989

[51] Int. Cl.⁵ ............................... G02B 6/26
[52] U.S. Cl. ..................... 350/96.15; 350/96.14; 350/96.29
[58] Field of Search ............... 350/96.13–96.15, 350/96.29, 96.3, 358, 371, 314

[56] References Cited

U.S. PATENT DOCUMENTS 4,735,476  4/1988  Heffner et al. .............. 350/96.13
4,735,485  4/1988  Shaw et al. ................ 350/96.13 X

FOREIGN PATENT DOCUMENTS 61-138239  6/1986  Japan ...................... 350/96.13

Primary Examiner—John D. Lee
Assistant Examiner—John Ngo
Attorney, Agent, or Firm—Knobbe, Martens, Olson & Bear

[57] ABSTRACT

An acousto-optic device which is incorporated into a fiber optic system to define, based upon device configuration, an element such as a phase modulator, optical tap, frequency shifter or mode coupler. The device comprises an acoustic transmission member having a groove therein which is secured in the Hertzian contact along a continuous portion of its surface with an optical waveguide so as to communicate acoustic signals from a transducer affixed on the member through the Hertzian contact area and into the optical waveguide. In one preferred embodiment the member comprises a capillary tube having a bore that is substantially the same diameter as the optical waveguide to which the device is to be affixed. A portion of the capillary tube is removed to expose the base, thereby defining a groove along the capillary substrate. In one preferred embodiment an acoustic transducer is deposited on the curved surface opposite the groove to focus acoustic signals from the transducer toward the groove. In another preferred embodiment, a portion of the capillary substrate opposite the groove is lapped to form a substantially flat surface which is parallel to the plane of the groove. An acoustic transducer is then deposited on the flat surface. The capillary substrate may also be lapped to form a wedge configuration for launching acoustic waves at an angle with respect to the groove. The optical waveguide is pressed into the groove to form the Hertzian contact with the groove.

25 Claims, 9 Drawing Sheets

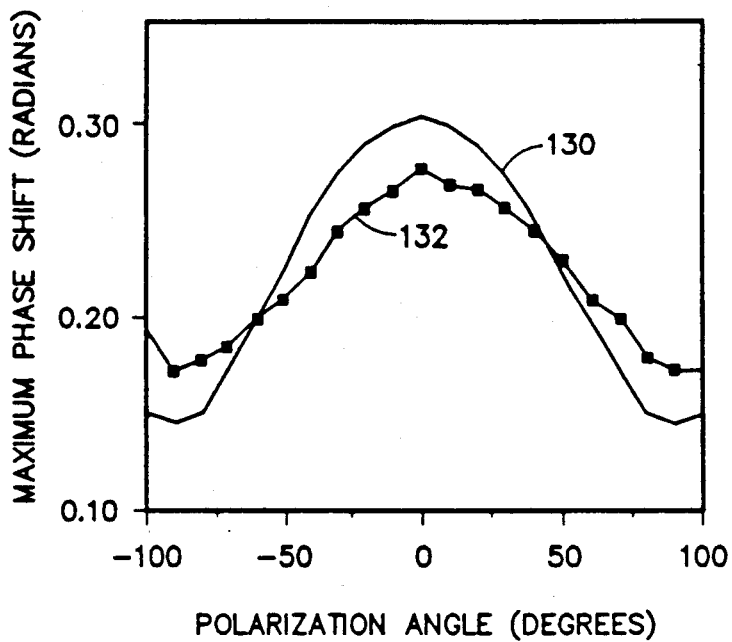
FIG. 13
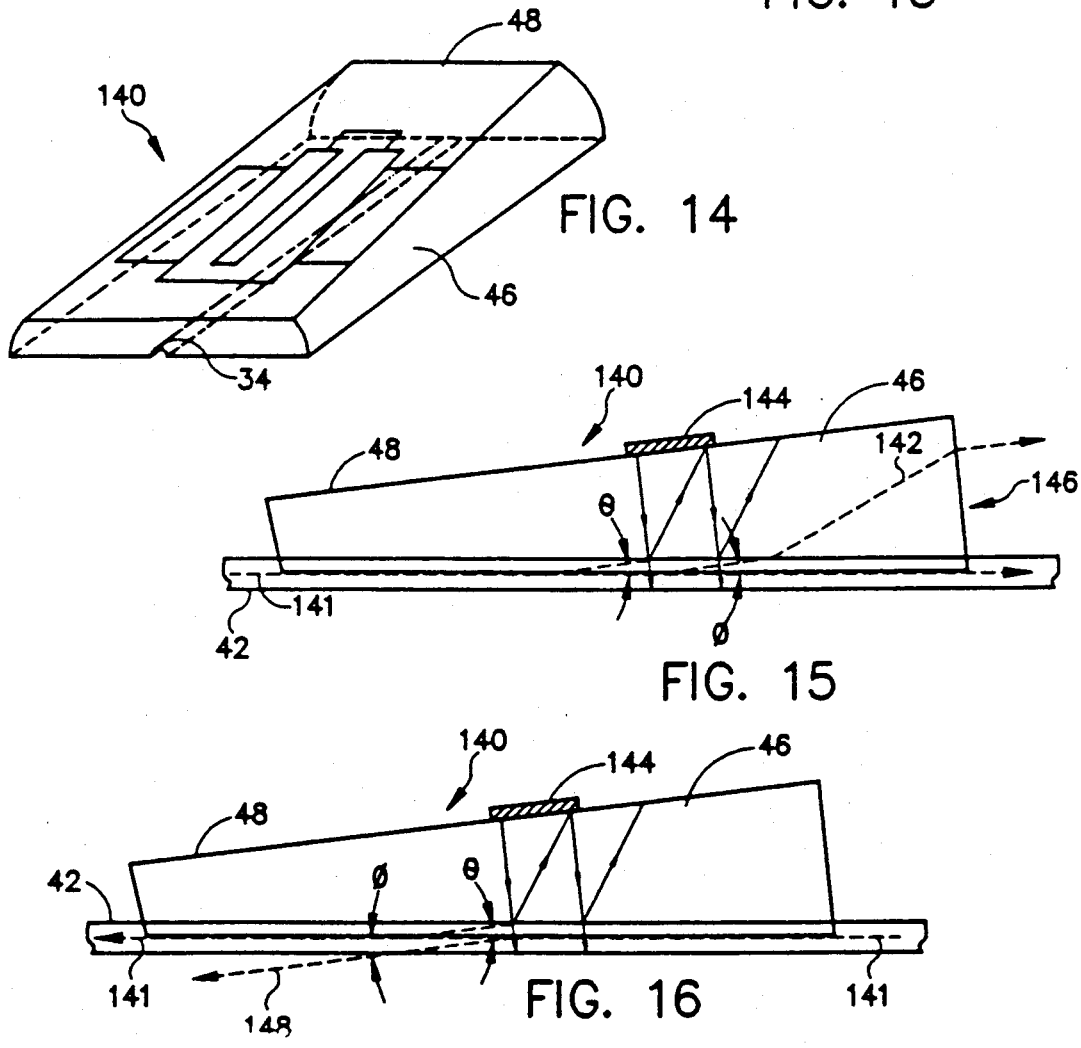
FIG. 14
FIG. 15
FIG. 16

FIG. 17
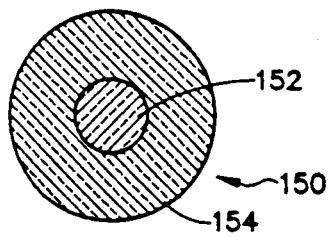
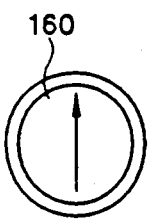
FIG. 18a
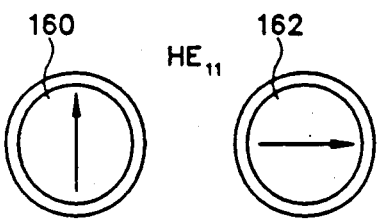
FIG. 18b
FIG. 18c
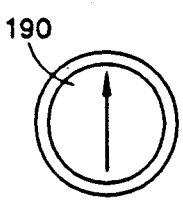
FIG. 19a
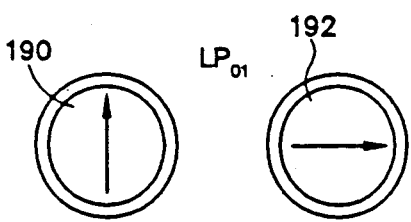
FIG. 19b
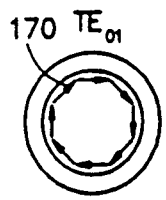
FIG. 18d
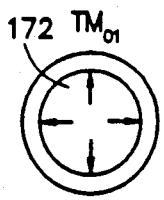
FIG. 18e
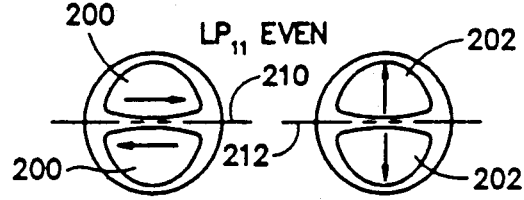
FIG. 19c FIG. 19d
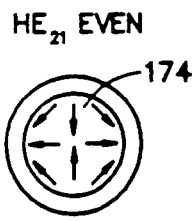
FIG. 18f
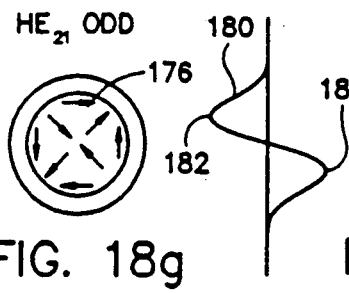
FIG. 18g
FIG. 18h
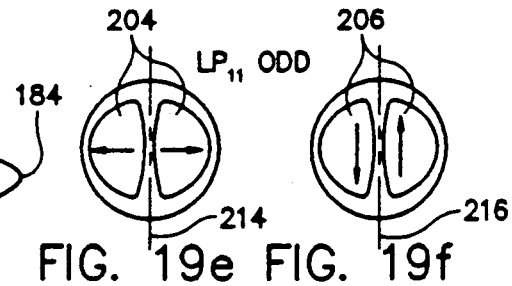
FIG. 19e FIG. 19f

ACOUSTO-OPTIC MODULATOR FOR OPTICAL FIBERS USING HERTZIAN CONTACT WITH A GROOVED TRANSDUCER SUBSTRATE

BACKGROUND OF THE INVENTION

1. Field of the Invention

The present invention relates to acousto-optic devices for use with optical fibers, and particularly to an acousto-optic structure which is detachable from an optical fiber system, and which can be configured to define an acousto-optic modulator, an optical tap or a frequency shifter/mode coupler for two-mode optical fiber.

2. The Prior Art

Use of optical fiber technology in communications and remote sensing systems continues to increase, as more applications are developed. As applications in these technologies grow, so does the demand for simple, reliable components, including light modulators. For applications such as frequency shifting in fiber gyroscopes, mode-locking of fiber lasers, or switchable tapping of short-hall networks, in situ modulation of the guided light is desired as it avoids such detrimental effects as coupling losses and etalon effects.

For example, one prior art acoustic-transducer for use with optical fibers involved the transmission of an acoustic signal through a quartz block to an optical fiber embraced by the quartz block. The gap between the quartz block and the optical fiber was filled with a liquid to obtain acoustic impedance matching. This system avoided much physical damage to the fiber, but the use of the block and acoustic impedance matching fluid produced attenuation and reflections of the acoustic signal, limiting the acoustic signal frequency which could be used. Further, since the acoustic signal needed to intersect the small fiber, proper alignment of the acoustic transducer and the optical fiber through the block was critical. However, since the transducer was fixed onto the block, and since contact with the fiber was achieved by pressing a planar face of the block against the fiber, alignment of the device was very difficult during assembly. Since the block was fixed relative to the fiber after assembly, changing the alignment after assembly was virtually impossible. In addition, the use of liquid to interface the block with the fiber further complicated the system, as well as its assembly. As a result of difficulties such as these, different types of acoustic devices which eliminate the long path through the liquid are needed. At the same time other applications of this basic principle, such as modulator, have become of interest.

Demonstration of the growth of well-oriented films of zinc oxide has spawned a generation of all-fiber modulators, including phase modulators, modal couplers, and optical taps. While this technology is easily applied to the simple rectangular electrode requirements of phase modulators, more exotic devices such as mode couplers, frequency shifters and optical taps, which require transducer arrays for phase matching, are extremely difficult to fabricate. For example, these all-fiber devices require a fiber suitable for high vacuum conditions; i.e., one with its acrylate jacket completely removed or with a special jacket of metal or possibly teflon. The process of preparing the fibers in this way and of fabricating the transducer on these tiny fibers is very difficult and involves a high likelihood of fiber breakage before fabrication is complete. All-fiber devices have the additional disadvantage of interlocking of waveguide and modulator. In other words, these devices must be made on a relatively short segment of the optical fiber, and must be spliced into existing systems. This requires interruption of system operation and the splicing may result in degradation of system operation. Furthermore, device replacement requires interruption of light transmission in the system.

Unsuccessful efforts to overcome the difficulties described above have been directed to techniques such as inserting the optical fiber into an intact capillary, and using a quartz stacking wax as a coupling medium. One attempt to produce such a phase modulator is described in F. S. Hickernell, et al., *Thin-Film Zinc Oxide Bulk Wave Transducer Structures for Acousto-Optic Phase Modulation of Single-Mode Fibers*, Proc. IEEE Ultrasonics Symposium, 1986, pp. 715–718. In that case, no phase modulation was detected due to poor coupling.

Based on the above, it would be an important improvement in the technology to provide an acousto-optic modulator which would avoid the detrimental effects of coupling losses and etalon effects, would be relatively simple to fabricate, and which would operate at efficiencies comparable to all-fiber modulators wherein zinc oxide is deposited directly onto the optical fiber. It would be a further improvement in the technology to provide such a modulator which is a separable component from the waveguide, so that the modulator may be applied to and removed from existing fiber systems in a manner which readily permits accurate alignment of the transducer with the fiber, and which avoids interruption of light transmission and provides greater flexibility in choice of fiber. It would be still a further improvement in the technology to provide such a modulator which uses a planar transducer geometry, so as to simplify the lithography needed for more intricate electrode patterns such as those required for mode couplers, frequency shifters and optical taps.

BRIEF SUMMARY OF THE INVENTION

The present invention comprises an acousto-optic modulator for use with optical fibers, and a method for its fabrication. In one preferred embodiment, a glass capillary is provided, having approximately the same inner diameter as the outer diameter of an optical fiber waveguide. The capillary is cut in half, so that an inner surface of the capillary half defines an approximately semi-circular groove configuration. The fiber is stripped only in the region where it will be placed in contact with this capillary groove. The fiber is then pushed into the groove in the capillary, so as to form a Hertzian contact with the groove. A zinc oxide transducer is fabricated on the external surface of the capillary, in an orientation so that acoustic waves generated thereby will be focused on the fiber core.

In another preferred embodiment, an exterior side of the above-described capillary, which is opposite to the groove, is lapped to form a flat top surface so that the device is configured as a flat piece of glass having a thickness in the range of about one-hundred micrometers to one millimeter. A gold film is then deposited on the top surface of the capillary. This is followed, in turn, by deposition of zinc oxide (ZnO) and then a metal electrode, which can be photolithographically patterned to form a wide range of possible electrodes, such as interdigital transducers, two or three-phase interdigital systems, Fresnel lenses, and the like. If an acoustic wave is excited in the transducer, the wave propagates through the glass substrate, through the Hertzian contact formed between the groove and the optical fiber waveguide, and into the fiber core region, where it interacts with optical signals traveling in that core region.

In still another preferred embodiment, a thin gold film is placed between the optical fiber waveguide and the groove in the capillary before the fiber is pushed into the groove. This tends to encourage a good acoustic contact over the complete semi-circular region of the fiber which is adjacent to the groove.

In one preferred embodiment of the invention, the lapped surface of the capillary is oriented so as to be exactly parallel to the groove in the capillary, and, thus, to the fiber core. In this configuration, the acoustic wave in the core region has a constant phase over the entire interaction length. This creates a phase modulator for use with single-mode fiber.

In another embodiment, the invention comprises a coupler for transferring light between the two lowest-order spatial modes of an elliptical core fiber. A strain wave traveling through the core region causes a refractive index change proportional to the strain field as a result of the acousto-optic effect. Thus, an electric field present in the fiber induces a polarization field in the fiber. If the electric field is the fundamental mode field, then the polarization field will efficiently couple to the second-order mode if the polarization field overlaps the excited optical-mode field and if there is phase-matching of the polarized field with the excited mode field.

These conditions are met by launching an acoustic wave at an appropriate angle into the core region, with the wave having a wavelength nearly equal to the core diameter. This wavelength produces an asymmetric strain field which, when multiplied by the fundamental mode field, approximates the second-order mode field. The acoustic wave is launched at an angle by polishing the top flat surface of the capillary at an angle with respect to the groove. By so doing, the mode coupler is produced.

The device of the present invention also defines a Bragg tap, when the top flat surface of the capillary is oriented at an angle with respect to the groove and, accordingly, the core of the optical fiber waveguide. Such a Bragg tap can be used as either an amplitude modulator or a switchable input/output coupler. Furthermore, the mode coupler embodiment of the invention may be used as a frequency shifter, or as an optical bandreject filter, utilizing the dependence of beat length upon optical frequency to accomplish its intended purpose.

These and other advantages and features of the present invention will become more fully apparent from the following description and appended claims taken in conjunction with the accompanying drawings.

BRIEF DESCRIPTION OF THE DRAWINGS

FIG. 6b is a front cross-sectional view of the press mechanism of FIG. 6a, in it's assembled configuration and taken along lines 6b—6b of FIG. 6a.

FIG. 7 is a top plan view an electrical housing for use in the press mechanism of FIG. 6a.

FIG. 13 is a graphical illustration of the maximum phase shift of the device illustrated in FIG. 3, as a function of the optical polarization angle at the resonant frequency with +18 dBm input power.

FIG. 14 is a perspective illustration of another presently preferred embodiment of the present invention showing a lapped capillary substrate defining a wedge configuration.

FIG. 15 is a side schematic diagram of the embodiment of the invention illustrated in FIG. 14, illustrating operation of that embodiment as an optical tap with light flow in a first direction through the waveguide.

FIG. 16 is a side schematic diagram of the embodiment of FIG. 14, illustrating operation of the device as an optical tap with light flow in a second direction through the waveguide.

FIG. 17 is a cross-sectional view of an exemplary circular core optical fiber.

FIGS. 18a and 18b illustrate the electric field intensity distribution patterns for the vertically polarized and horizontally polarized $HE_{11}$ (fundamental) propagation modes of the circular core optical fiber of FIG. 17.

FIG. 18c is a graph of the electric field amplitude distribution corresponding to the intensity distribution of FIGS. 18a and 18b.

FIGS. 18d, 18e, 18f and 18g illustrate the electric field intensity distribution patterns for the $TE_{01}$, $TM_{01}$, even $HE_{21}$ and odd $HE_{21}$ (second order) propagation modes, respectively, of the circular core optical fiber of FIG. 17.

FIG. 18h is a graph of the electric field amplitude distribution patterns for the second order modes of the optical fiber of FIG. 17.

FIGS. 19a and 19b illustrate the $LP_{01}$ approximations for the first order propagation modes of the optical fiber of FIG. 17.

FIGS. 19c, 19d, 19e and 19f illustrate the $LP_{11}$ approximations for the second order propagation modes of the optical fiber of FIG. 17.

DETAILED DESCRIPTION OF THE PREFERRED EMBODIMENTS

1. Modulator Having a Cylindrical Transducer Substrate

The invention is best understood by reference to the figures wherein like parts are designated with like numerals throughout.

The present invention comprises a grooved transducer substrate, upon which is secured a transducer, so that the transducer can be detachably connected to an optical fiber system. Depending upon the device configuration defined by the combination of the transducer and the substrate, the device can be used in conjunction with an optical fiber system to define components such as phase modulators, frequency shifters, modal couplers and optical taps.

Figure 1:
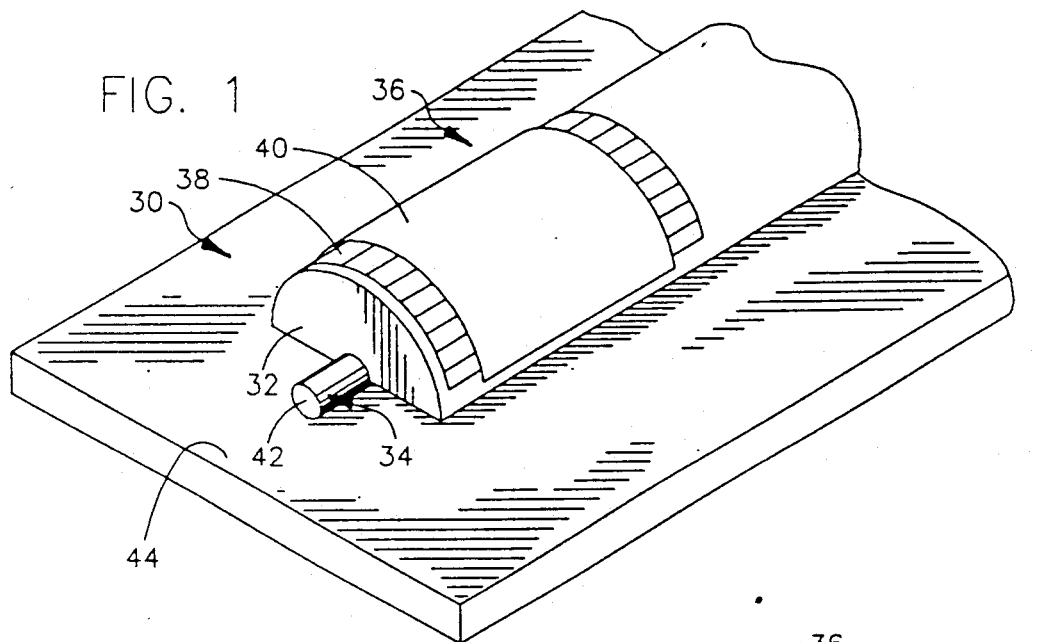
FIG. 1 is a perspective view of a presently preferred embodiment of the present invention illustrating a transducer deposited on the curved surface of a substrate.

One presently preferred embodiment of the invention may be described by reference to FIG. 1. Specifically, FIG. 1 illustrates an acousto-optic modulator for optical fibers, generally indicated at 30. The modulator 30 includes a substrate 32 formed of a material such as glass which permits through transmission of acoustic signals. Preferably, the capillary substrate 32 is formed from a member having an inner bore whose radius of curvature is substantially the same as an optical fiber. For example, a commonly used single mode optical fiber for use in this invention would have a diameter of about 125 $\mu$m.

One presently preferred embodiment of this member comprises a conventional capillary tube (or capillary). Such capillaries are well known in the technology, and are widely available. In order to form this member, a portion of the capillary is lapped down to form a half cylinder as illustrated in FIG. 1, with a groove generally indicated at 34, extending along its length.

A transducer generally indicated at 36 is fabricated on an upper side surface of the capillary substrate 32 so as to focus acoustic signals generated by the transducer 36 toward the groove 34. Procedures for fabricating transducers on cylindrical geometries have become well known in the industry. For example, a procedure for fabricating thin film zinc oxide transducers on fibers is described in B. L. Heffner and B. T. Khuri-Yakub, "Deposition of Oriented Zinc Oxide on an Optical Fiber," *Applied Physics Letters*, Volume 48, Page 1422, 1986, which reference is hereby incorporated herein by reference. Such a transducer typically includes a bottom electrode 38 made of material such as copper and gold which is of a thickness such as 9500-Å, deposited at about 225° C. A layer of zinc oxide 40 which may be on the order of 5.5 $\mu$m thick is deposited on the bottom electrode 38 by use of a reactive planar magnetron sputtering system. A top electrode may be deposited on the zinc oxide layer by well known conventional methods such as contact photolithography and evaporation. Of course, any of the generally known transducer configurations which are used on cylindrical geometries could be used in the device illustrated in FIG. 1.

To incorporate the modulator 30 into an optical system, an optical waveguide 42, such as an optical fiber, has its acrylate jacket removed along a portion of its length corresponding to the length of the modulator 30. The waveguide 42 is placed in alignment with the groove 34, which has a radius very slightly larger than the fiber, typically 1 micron, and is positioned upon a flat surface such as that defined by a plate 44 constructed of material such as aluminum. External force is applied to the plate 44 by a press (not shown), for example, to move it toward the modulator 30. In addition, force is applied to the modulator 30 in a direction toward the plate 44. By this means, the waveguide 42 is pressed into the groove 34 and a Hertzian contact is formed preferably along a continuous length between the surface of the waveguide 42 and the surface of the groove 34.

A Hertzian contact results when any two rigid bodies are forced together into a "point" contact. The high stress in the neighborhood of this point causes elastic deformations, bringing the bodies into hard contact over a finite region. The resulting hard contact makes it possible to launch acoustic waves through an acoustic path formed entirely of solid material and into the waveguide 42 through the finite region.

Figure 2:
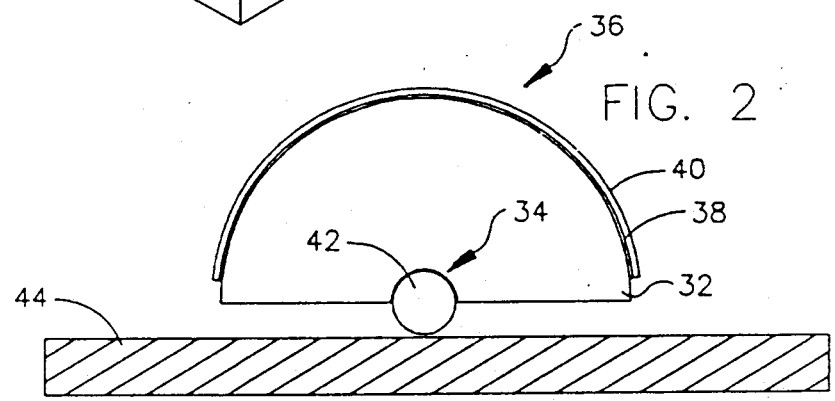
FIG. 2 is a left side elevational view of the embodiment illustrated in FIG. 1.

Referring to FIG. 2, it is seen that the circular orientation of the capillary substrate 32 permits the transducer 36 to accurately focus the acoustic signals so that they are passed through the Hertzian contact preferably formed along a continuous portion of the groove 34 and the optical fiber waveguide 42, and into the fiber core region.

2. Fabrication of Grooved Transducer Substrates

Providing a groove with precisely the same radius of curvature as an optical fiber (62.5 μm for example) is a non-trivial task. Nonetheless, the radius mismatch must be within a few microns for a wide contact area; the given radius must be slightly larger than that of the fiber. Ordinary glass capillary tubes have a remarkably good inner surfaces, generally circular and smooth, and they may be lapped lengthwise as described above, to form a surface with a high-quality cylindrical groove.

Figure 3:
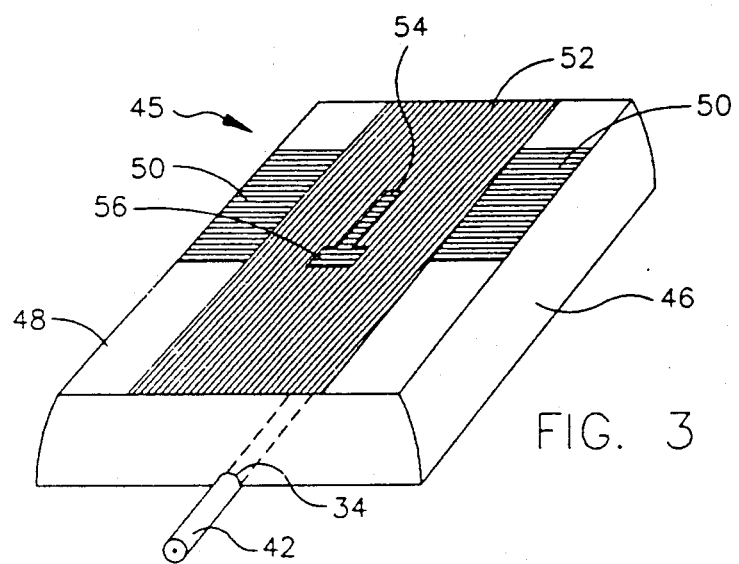
FIG. 3 is a perspective view of another presently preferred embodiment of the present invention illustrating a transducer deposited on a lapped top surface of a substrate.

Referring to FIG. 3, another preferred embodiment of the invention may be described. The acousto-optic modulator generally indicated at 45 comprises a substrate 46 which includes a groove 34 on its lower surface, and which is substantially flat on its upper surface. The substrate 46 is formed by use of a capillary, which is lapped to form the groove 34 as described above. After forming the groove 34, the upper portion of the capillary is polished to form an outer face 48 which is substantially parallel to the face adjacent groove 34. The resulting substrate 46 has dimensions, in one preferred embodiment, of 1 mm in thickness, 25 mm in length, and 6 mm in width.

Using projection lithography to pattern alignment marks onto the outer face 48, directly over the groove 34, reference points are etched for later alignment of a contact mask defining the transducer. A transducer deposited onto this outer face 48 then excites acoustic waves which propagate through the substrate 36, through the Hertzian contact formed between the groove 34 and the waveguide 42 positioned therein, and into the core region of the optical fiber waveguide 42.

3. Phase Modulator for Single Mode Fiber

The phase modulator of FIG. 3 was fabricated by first lapping the capillary to define a flat lower surface (not shown) which is adjacent to and exposes the groove 34. The opposite portion of the capillary was then polished to define the flat outer face 48 as was described above. In one preferred embodiment, the transducer is applied to the outer face 48 by first evaporating 300 nm of Ti/Au as a ground plane 50, masking 5 mm from one end and 10 mm from the other for later alignment purposes. A 7 μm layer of ZnO is then sputtered over the metalization, defining a ZnO film 52. Using contact photolithography for patterning, a top electrode of Cr/Au is evaporated onto the ZnO film 52 so as to be positioned directly over and in parallel alignment with the groove 34. A bonding pad 56 of Cr/Au is also evaporated on the ZnO film 52 at one end of and in contact with, top electrode 54. In one preferred embodiment, the top electrode 54 is 80 μm wide and 4 mm long. The width was selected to reduce the diffraction loss while keeping the capacitance of the transducer low.

Figure 6A:
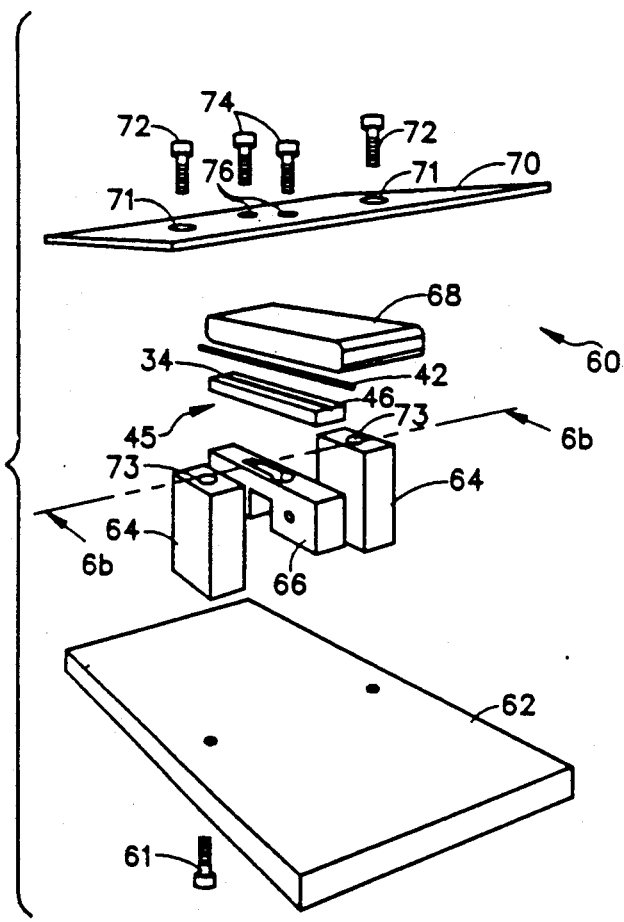
FIG. 6a is an exploded perspective view of one presently preferred embodiment of a press mechanism for securing an optical fiber within the groove of a capillary substrate of the present invention.
Figure 6B:
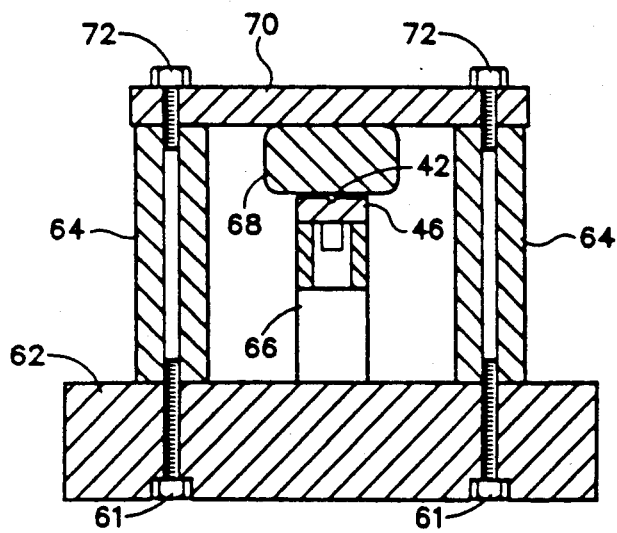

The edges of the ZnO film 52 are etched to provide an avenue for achieving electrical contact between the ground plane 50 and a conventional external control or monitoring device (not shown). An electrical connection is also made to the bonding pad 56, permitting it to be electrically tied to an external device. The ground plane 50 is then silver-painted to an aluminum connector housing (see FIGS. 6a and 6b). Epoxy is used to reinforce the bond between the capillary substrate 46 and the aluminum housing, with the bond also used to transfer the static pressure necessary for a good acoustic contact.

If the outer face 48 of the device in FIG. 3 is parallel to the groove 34 and, thus, to the core of the waveguide 42, the acoustic wave in the core region has a constant phase over the entire interaction length of the optical path wherein the acoustic wave interacts with light traveling in the waveguide 42. As the acoustic signal from the transducer, referred to as the strain wave, passes through the core of the waveguide 42, a refractive index modulation is induced through the acousto-optic effect in the glass. This refractive index modulation is mathematically represented as follows:

$$\Delta n = n \frac{\Delta \epsilon}{2\epsilon} = -n \frac{\Delta B}{2B} = -\tfrac{1}{2} n^3 p S \tag{1}$$

where $\epsilon$ is the dielectric constant of the core; $n = \sqrt{\epsilon/\epsilon_0}$ its refractive index; to the dielectric constant of free space; and B is the relevant component of the impermeability tensor, defined by $B = \epsilon^{-1}$, p is the strain-optic coefficient, and S is the strain field. The guided light with wavelength $\lambda_{opt}$ accumulates a phase retardation, modulated at the acoustic frequency as it propagates through this interaction length $L_{INT}$. This phase retardation is mathematically represented as follows:

$$\Delta \phi = 2\pi \Delta n \, L_{INT}/\lambda_{opt} \tag{2}$$

Accordingly, the modulator of FIG. 3 defines an efficient phase modulator which can be easily connected and/or disconnected from a fiber optic system without affecting the continued system operation.

Although FIGS. 1-3 disclose presently preferred embodiments of the present invention, and the method for fabricating the invention has also been described, it will be appreciated that other modifications of the invention can be provided, and these are also considered to fall within the scope of the invention. For example, the ZnO film 52 of FIG. 3 and the top electrode 54 and bonding pad 56 can be photolithographically patterned to form a wide range of possible electrodes, such as interdigital transducers, two or three-phase interdigital systems, Fresnel lenses and so forth.

Figure 4:
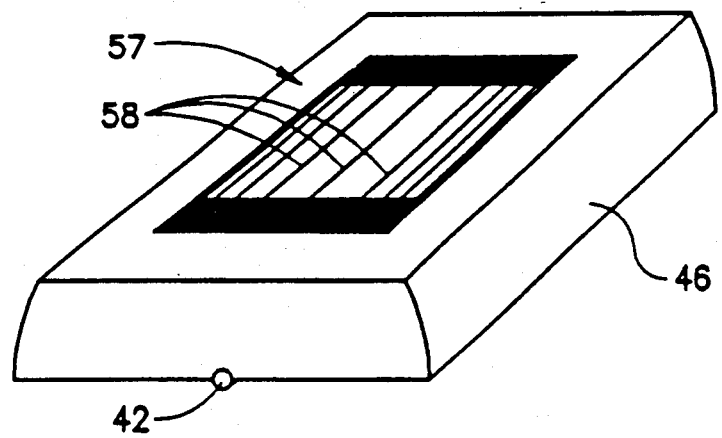
FIG. 4 is a perspective view of another presently preferred embodiment of the invention, illustrating a transducer forming a first Fresnel lens configuration deposited on a substrate.

One interdigital transducer configuration which finds application in the present invention is described in U.S. Pat. No. 4,735,476 to Heffner, et al. FIG. 4 illustrates one embodiment of the invention incorporating a Fresnel lens 57 transducer for focusing the acoustic beam on the axis of the optical fiber waveguide 42. The device of FIG. 4 is fabricated by depositing electrodes 58 of the Fresnel transducer 57 on the surface of the zinc oxide substrate 46 so the electrodes 58 lie in the axial direction of the optical fiber waveguide 42. If $R_n$ is the distance of the nth electrode from the center of the waveguide 42, then $R_n$ must be chosen such that $R_n = n\lambda_s = \sqrt{x_n^2 = h^2}$, where $x_n$ is the distance along the transducer surface of the nth electrode from the center electrode, and h is the distance from the axis of the waveguide 42 to the center electrode 58 opposite the waveguide 42. The electrodes 58 are connected together and driven as a single transducer 57. This technique will produce a higher beam intensity on the axis of the optical fiber waveguide 42 than a simple single electrode plane transducer.

Figure 5:
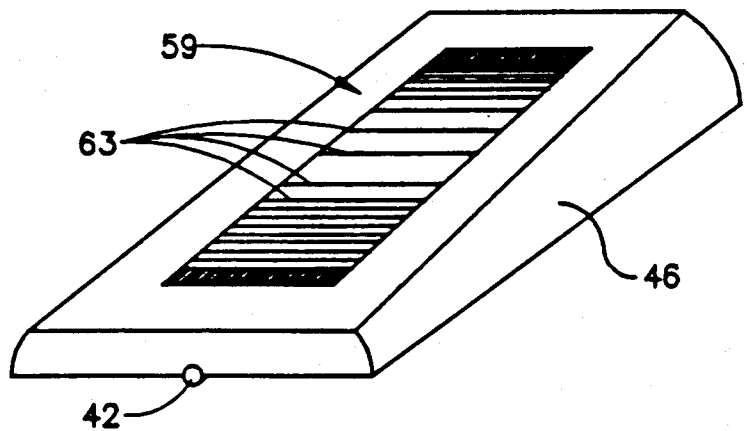
FIG. 5 is a perspective view of another presently preferred embodiment of the invention, illustrating a transducer forming a second Fresnel lens configuration deposited on a substrate.

A second form of Fresnel lens transducer is shown at 59 in FIG. 5. The transducer 59 comprises electrodes 63 aligned perpendicular to the axis of the optical fiber waveguide in a wedge type configuration. Fabrication of a wedge-type transducer is described more fully hereinafter with respect to FIGS. 14-16. The device of FIG. 5 focused acoustic beam by Bragg diffraction, which in turn can produce an optical beam which is focused to converge in the axial direction to a line perpendicular to the axis of the fiber.

There are also numerous different choices of materials which could be employed for the substrate. For example, $LiNbO_3$ can be utilized as the material for substrate 46. In this case, a groove 34 is lapped into the substrate and the portion of the optical fiber waveguide 42 which is to be positioned adjacent to substrate 46 is metal coated. An electrode is then deposited on the top surface or outer face 48 of the $LiNbO_3$ substrate, and a potential is applied between the electrode on outer face 48 and the optical fiber waveguide 42 to form an acoustic transducer.

With respect to the method by which the waveguide 42 is secured in Hertzian contact with the surfaces of the groove 34, it is also possible to place an intervening material such as a thin gold film between the waveguide 42 and the groove 34. Upon squeezing the waveguide 42 into the groove 34, the gold film will assist in making a good contact over the complete semicircular region wherein the waveguide 42 is adjacent the surface of groove 34. Features such as those described herein are considered to be within the scope of the invention as defined in the claims appended hereto.

Having fabricated the modulator 45 of FIG. 3 in the manner discussed above, a portion of an optical waveguide 42 is pressed into the groove 34 in order to place the modulator 45 into operation in an optical system. The waveguide 42 comprises, in one preferred embodiment, a single mode fiber having a diameter of approximately 125 μm. This waveguide 42 is squeezed into the groove 34 through use of a press, such as the press illustrated in FIGS. 6a and 6b. Specifically, the press of FIG. 6a comprises one preferred embodiment of a mechanical press for securing the waveguide 42, such as the single mode fiber, in Hertizan contact with the face of the groove 34. The mechanical press, generally indicated at 60, includes a base plate 62 having a substantially flat upper surface, and constructed of a material which will provide adequate support, such as aluminum. At least two spacers 64 are secured upon the base plate by means such as screws 61, so as to extend upwardly therefrom. The spacers are spaced from each other a distance sufficient to permit the positioning therebetween of the acousto-optic modulator 45.

The acousto-optic modulator 45 is secured along its outer face to a top surface of an electrical housing 66, in the manner previously described with respect to FIG. 3. The electrical housing 66, with the modulator 45 secured to its top surface, is positioned upon an upper surface of the base plate 52, so as to be located between the spacers 64.

With the modulator 45 positioned so that the groove 34 is facing in the upward direction, the waveguide 42 is positioned over the groove. An optical flat 68, comprised of a hard substance such as fused quartz, and having substantially flat and parallel upper and lower faces, is positioned between the spacers 64 and above the modulator 45, so as to be in a position to apply downward pressure onto the waveguide 42 when downward pressure is exerted upon the optical flat 68. Extending between the upper ends of spacers 64 is a top plate 70 having a substantially flat lower face, which extends over the optical flat 68 between the spacers 64. The top plate 70 is preferably constructed of a rigid material such as aluminum, and is adjustably secured to the top ends of the spacers 64 by means of adjustable devices such as screws 72 which extend through holes 71 in the top plate 70 and into threaded receiving holes 73 in the spacer, thereby connecting the top plate 70 with the spacers 64. Additional screws 74 are extended through threaded holes 76 in the central portion of the top plate 70 so that their lower points contact the upper surface of the optical flat 68.

Through use of screws 72, the top plate 70 is vertically positioned with respect to the optical flat 68 to secure the flat 68 against the waveguide 42 which is adjacent the groove 34 of the substrate 46. Additional downward pressure is provided on the optical flat 68 by extending the screws 74 downwardly through the holes 76. Such pressure is transmitted through the optical flat 68 to the optical waveguide 42 to squeeze the waveguide into the groove 34, and to secure that waveguide 42 in place. Preferably, vacuum grease is introduced between the glass surfaces of the waveguide 42 and the groove 34 to assist in coupling those surfaces together, thereby achieving a higher quality of acoustic coupling.

Optionally, additional tapped holes can be provided in the top plate 70 to provide additional contact along the length of the optical flat 68, and optionally, to provide means for "rocking" the optical flat back and forth with respect to the upward directed face of the substrate 46, to thereby assist in seating the waveguide 42 within the groove 34. The relationship of the various components of the mechanical press 60 can more easily be understood by reference to FIG. 6b, which illustrates the mechanical press 60 in "assembled" form.

Figure 7:
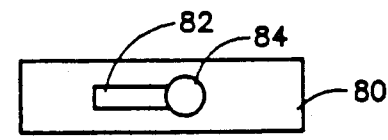

The configuration of the electrical housing 66 which is bonded to the substrate 46 can best be described by reference to FIGS. 7 and 8. Referring initially to FIG. 7, it is noted that an upward face 80 of the housing 66 includes a groove 82 which extends longitudinally along the central portion of the upward face 80. The groove 82 is sized so that when the electrical housing 66 is aligned with the modulator 45, with the upward face 80 of the housing 66 in mating contact with the outer face 48 of the substrate 46, the top electrode 54 is isolated from contact with the electrical housing 66. Likewise, a through hole 84 extends from the upward face 80 through the body of the electrical housing 66 to permit wire connection of the bonding pad 56 to an external device when the electrical housing 66 is secured in position with the modulator 45. Of course, it will be appreciated that the through hole 84 is of a size such that it permits isolation of the bonding pad from contact with the electrical housing 66. Insulating varnish is applied to the inner surface of the through hole to ensure isolation of the wire from the electrical housing.

Figure 8:
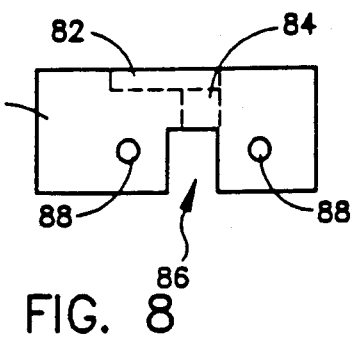
FIG. 8 is a left side elevational view of the electrical housing of FIG. 7.

Referring to FIG. 8, the groove 82 extending in the upward face 80 is represented, as well as the through hole 84 which extends from the upward face 80 through the body of the electrical housing 66 to an opening in a notch generally indicated at 86 in the lower body of the housing 66. The notch 86 also provides a location for securing small tuning elements, such as gold wire inductors, strip lines and chip capacitors, as well as allowing space for connectors. Insulating varnish is applied in the notch for isolation of these elements from the housing. Tapped holes 88 are provided in the sides of the electrical housing 66 for securing connectors which tie the electrical leads connecting the transducer to other external monitoring and control elements.

Figure 9:
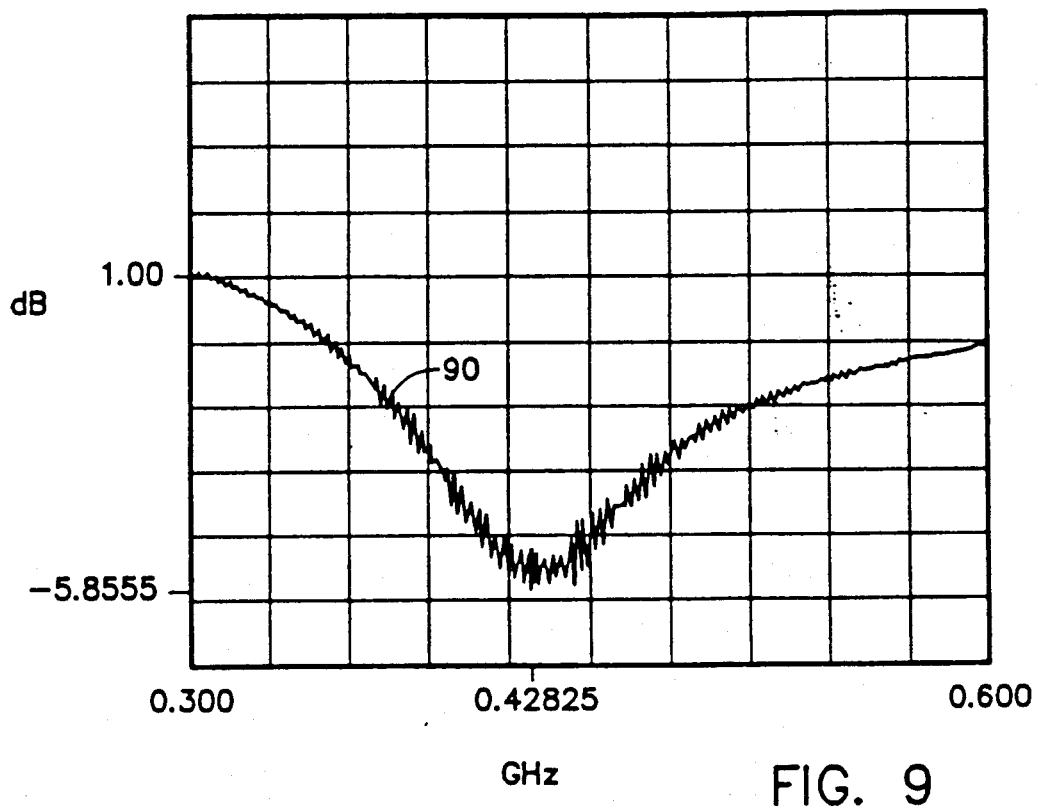
FIG. 9 is a graphical illustration of the effects of the acoustic resonances superimposed on the broadband transducer response of the phase modulator of FIG. 3, shown as a plot of electrical reflection coefficient as a function of frequency.

A prototype of the phase modulator illustrated in FIG. 3 was tested both electrically and optionally. The graph illustrated in FIG. 9 shows the effects of the acoustic resonances superimposed on the broad band transducer response. The trace line 90 illustrates this acoustic resonance in the voltage reflection coefficient of the device expressed in decibels (dB) on the vertical axis, with respect to frequency (GHz), on the horizontal axis. This trace indicates the presence of a beating signal between the closely spaced resonances resulting from multiple reflections in the capillary substrate 46, and the more widely spaced resonances in the optical fiber waveguide 42.

Figure 10:
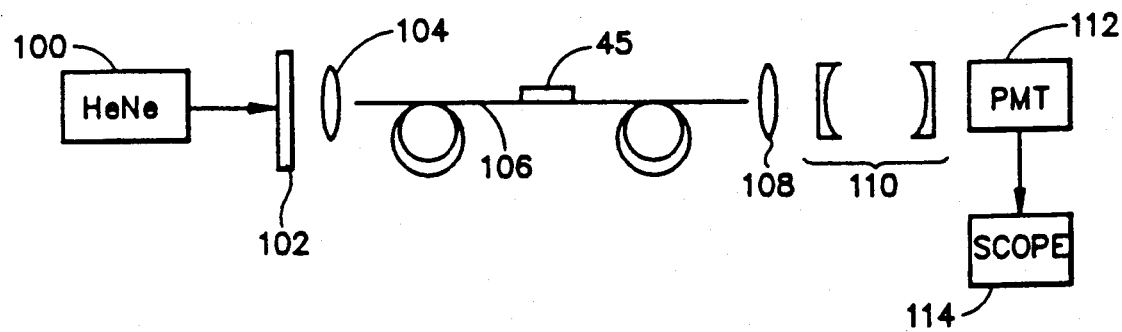
FIG. 10 is a schematic illustration of an experimental configuration used in testing the performance of the device of FIGS. 1 and 3.

Phase modulation produced by the phase modulator of FIG. 3 was measured by comparing the relative amplitudes of the first side bands to the carrier frequency of the guided mode using the experimental configuration illustrated in FIG. 10. Specifically, referring to FIG. 10, single frequency HeNe laser light was coupled from a laser 100 through a ½ wavelength plate 102 and a 20× objective lens 104 to a single-mode optical fiber 106. The optical signal from fiber 106 was phase modulated as it passed through modulator 45, and the modulated light was then transmitted from an output end of fiber 106 through a 20× objective lens 108 and through a scanning Fabry-Perot etalon 110. From the scanning etalon 110 the optical signal was transmitted to a photomultiplier tube 112, and the output from the photomultiplier tube was then transmitted to an oscilloscope 114. This arrangement provides the optical spectrum of the phase modulated light, so that the light may be spectrally analyzed. By measuring the RF sideband amplitudes, it was possible to determine the maximum phase retardation imparted by the phase modulator 45.

Figure 11:
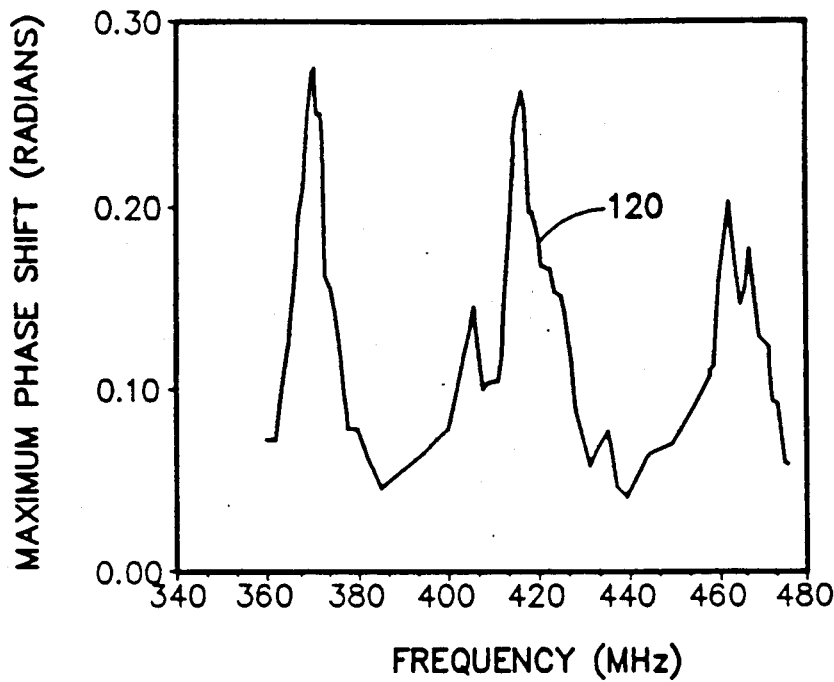
FIG. 11 is a graphical illustration of the maximum phase shift of the device illustrated in FIG. 3, as a function of acoustic frequency at +13 dBm input power.

FIG. 11 illustrates the maximum phase shift produced by the modulator 45 as a function of frequency. The trace line 120 in FIG. 11 was produced using the experimental configuration of FIG. 10, with 13 dBm input electrical power to the phases modulator 45. Here, the fiber resonances are dominant, resulting in sharp peaks with FWHM band widths of approximately 14 MHz at center frequencies near 400 MHz. The approximately 46 MHz peak separation which is noted agrees well with the theoretical 48 MHz resonance separation between higher order radial modes of a cylindrical glass resonator of 125 $\mu$m diameter, as calculated from formulas in WP Mason, *Physical Acoustics*, Volume 1A, Academic Press, 1964; hence, the illustrated frequency response is expected.

Figure 12:
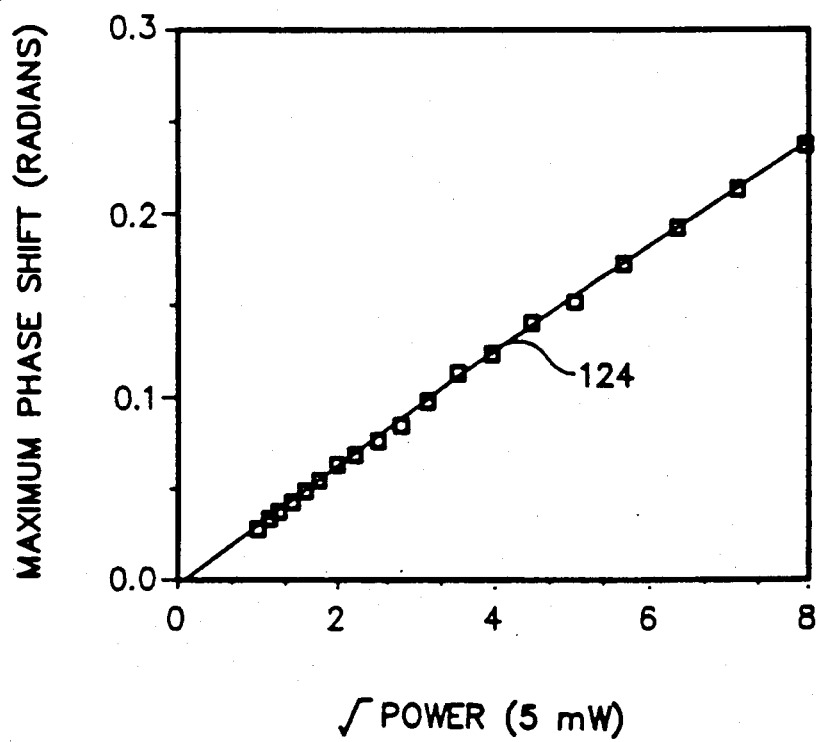
FIG. 12 is a graphical illustration of the maximum phase shift of the device illustrated in FIG. 3 as a function of input power at the resonant frequency.

Trace line 124 in the graph of FIG. 12 illustrates the power dependence of the maximum phase shift at resonance, in the phase modulator of FIG. 3. The graph of FIG. 12 shows the expected linearity with voltage up to an input power of 600 mW, at which point thermal effects cause the resonant frequency to drift. By tuning the frequency, a phase retardation of 1.2 radians was observed at the highest applied power of 1.3 W(CW). Theoretically, one could expect an efficiency of 7.7 radians/$\sqrt{W}$ for such a device, assuming all electrical power is converted into a traveling strain wave. The observed loss may be accounted for by a combination of sources, such as; lack of acoustic focusing, electrical mismatch, diffraction and imperfect contact between the single-mode fiber 106 and the groove 34 in the phase modulator 45 of FIG. 3.

In FIG. 13, trace line 130 illustrates the theoretical value of the maximum phase shift in radians as a function of the polarization angle for a 13 dBm input power into the phase modulator 45 at the 416 MHz resonance, which arises from the different strain-optic coefficients for polarizations parallel and perpendicular to the strain field. In particular, because light polarized parallel to the particle displacement sees a smaller strain-optic coefficient (p=0.12) than perpendicularly polarized light (p=0.27), the modulation efficiency should have the theoretical phase modulation illustrated by trace line 130, proportional to $\pi[(0.12)^2 \sin^2 \theta + (0.27)^2 \cos^2 \theta]$. The trace line 132 illustrates the actual response of the modulator of FIG. 3 as measured using the experimental set-up of FIG. 10. The slight discrepancy with the theoretical curves is believed to be caused by polarization coupling within the circular core single mode fiber 106.

Although the modulator of FIG. 3 appears to be slightly less efficient than the all-fiber devices which have been previously reported, because the cylindrical fiber geometry focuses the acoustic power to the core in the latter case, the simpler lithographic fabrication procedure allows longer interaction lengths than the projection lithography used on the all-fiber modulators; hence the efficiency of the modulator of FIG. 3 may be improved upon. Both the modulator of FIG. 3 and the all-fiber devices experience strong resonances, but acoustic impedance-matching techniques used for the all-fiber modulator can be easily applied to the capillary phase modulator 45 to minimize those resonances. Furthermore, the modulator 45 permits separation of the waveguide 42 from the modulator 45, facilitating modulator application and removal from existing fiber systems and providing greater flexibility in choosing the waveguide 42. Also, the planar transducer geometry, while sacrificing the focusing effect of the cylindrical all-fiber device transducers, greatly simplifies the lithography needed for more intricate electrode patterns such as those required for mode couplers, frequency shifters and optical taps.

4. Wedge Shaped Modulator

The modulator of the present invention also lends itself to applications such as a Bragg cell for tapping light from optical waveguides such as optical fibers, or as a frequency shifter for two-mode optical fiber. To achieve the broadest application of the modulator for these purposes, it would also be desireable to provide the modulator of FIGS. 1-3 in a wedge configuration. By reference to FIG. 14, the modulator of FIG. 3 is illustrated in a wedge configuration. The procedure for fabricating the wedge configuration for the modulator generally indicated at 140 in FIG. 14, is identical to the procedure previously described with respect to modulator 45 of FIG. 3, with the exception that the outer face 48 is polished so that it is angularly oriented with respect to the orientation of groove 34. The amount of this angular orientation is determined by the intended application of the device. For example, the angular orientation for use as an optical tap will depend upon factors such as the frequency of the acoustic signal and the amount of light to be tapped from the optical waveguide 42. A discussion regarding the selection of these angles will be presented hereinafter. Similarly, the frequency shifter or modal coupler requires an angular orientation which is determined by factors such as frequency, in a manner which will also be explained hereinafter.

5. Wedge Shaped Optical Fiber Tap

FIG. 15 illustrates a wedge shaped configuration of the modulator 140 in application as an optical fiber tap.

The modulator 140 of FIG. 15 functions substantially as a Bragg cell which causes part of the light guided in a fiber core to be deflected out of the fiber so that it may be detected or otherwise used directly as an optical signal. In addition, the device of FIG. 15 may act as a means for injecting light into an optical waveguide 42 such as an optical fiber. The device of FIG. 15 may also be utilized to control the amount of light going into or out of the optical waveguide 42 through use of an external high-speed electronic control signal, which varies the acoustic signal amplitude.

One embodiment of an acousto-optic Bragg cell utilizing the principles for operating the optical fiber tap illustrated in FIG. 15 is described in U.S. Pat. No. 4,735,476, entitled "ACOUSTO-OPTIC BRAGG CELL", to Heffner et al., issued Apr. 5, 1988, which patent is hereby incorporated herein by reference.

With the modulator 140 configured as illustrated in FIG. 15, and with proper angular alignment between the outer face 48 and the optical fiber waveguide 42, an acoustic signal from a transducer 144 deposited on the surface of the outer face 48 may be transmitted into the optical fiber waveguide 42, causing diffraction of light traveling along the path 141 through fiber 42, into the substrate 46 of the modulator 45 along the path illustrated at 142. This diffraction is produced as a result of a phenomenon, well known in the technology, known as Bragg scattering. Before the operation of the modulator illustrated in FIG. 15 is described in detail, the interaction of light with the acoustic wave resulting in the Bragg scattering condition will be discussed.

An acoustic wave propagating through a solid or liquid creates a periodic variation of the medium in time and space, thereby making it possible to deflect a light beam traveling in the medium. Because the sound wave travels through the medium with a finite velocity, rather than remaining stationary in space, the acoustic wave Doppler-shifts the frequency of the diffracted light beam as well as exciting it at an angle to the incident beam. By this means then, a light beam traveling along the path 141 through optical waveguide 42 is deflected by an angle $\phi$ to travel the path illustrated at 142. The amplitude of the deflected beam depends on the amplitude of the acoustic wave, while the angle of deflection $\phi$ of the beam depends on the acoustic frequency or its wavelength. Thus, for example, if the acoustic wave frequency is $\omega_s$ and its propagation constant is $k_s = 2\pi/\lambda_s$ where $\lambda_s$ is the acoustic wavelength, it can be shown that the relation between the input and output angles is:

$$k_1(1-\cos\phi) = \pm k_s \sin\theta \qquad (3)$$

where $\omega_1$ is the input frequency of the light; $k_1$ is the propagation constant of the light; and $\theta$ is the incident angle of the acoustic beam to a plane perpendicular to the longitudinal axis of the fiber.

In light of the above discussion, it will be appreciated that an acoustic signal transmitted from a transducer 144 through the substrate 46 into waveguide 42, along a propagation path which orients wavefronts of the acoustic signal in the optical fiber waveguide 32 at the Bragg angle $\theta$ with respect to the optical transmission path 141, will cause diffraction of light at an angle $\phi$ from the path 141 along the path 142. In the illustrated embodiments, the wavefronts of the acoustic signals are oriented perpendicular to the direction of propagation of the acoustic signal. However, even in conditions wherein the wavefronts may not be perpendicular to the acoustic signal propagation path, the diffraction of light at the angle $\theta$ will be produced so long as the acoustic propagation path places the acoustic signal wavefronts in the optical fiber waveguide 42 so as to intersect propagation path 141 at an angular orientation of $\theta$ with respect to that optical signal propagation path.

In one preferred embodiment, the substrate 46 is aligned in hard contact with the optical fiber waveguide 42 not only to permit passage of the acoustic signal from the transducer 140, but also to permit passage of diffracted light from waveguide 42 into the substrate 46 so as to travel along path 142. Without this arrangement, light traveling along path 142 would encounter the edge of the waveguide 30 and would be mostly reflected back into the fiber. An index matching medium of some type would be required to extract light out of the side of the waveguide 42.

The necessity of providing a separate medium to extract the tapped light is avoided by utilizing the substrate 46 both as a transmission medium for the acoustic signal from transducer 144, and as a light transmission medium for allowing the tapped light to pass from the waveguide along path 142. Thus, the light tapped from waveguide 42 passes through the substrate 46 along path 142 to a polished optical window generally indicated at 146 where it is detected or used directly as an optical signal. It is noted that if light where injected into the system through window 146, and along path 142, with the same amplitude and frequency as the acoustic wave generated by transducer 144, the injected light would follow path 142 until encountering the acoustic signal, at which time the light would be deflected to travel to the left along path 141. Thus, the present invention makes it possible to both tap light from the waveguide and to conveniently inject light into the optical waveguide 42.

Alternatively, the substrate 46 can be configured at an angle such that the acoustic wave from transducer 144 intersects the optical fiber waveguide 42 at an angle such that light is coupled from the optical path 141 in the core of the waveguide 42 into cladding 143 of the waveguide 42. The light traveling in the cladding 143 can be extracted therefrom by use of well known technologies such as bending of the waveguide.

By reference to FIG. 16, it can also be understood that with no other changes to the embodiment of FIG. 15, except a change in the direction of propagation of light in the optical fiber waveguide 42 from right to left, the acoustic wave causes diffraction of light traveling along path 141 to the downwardly directed path 148. Again, the deflection angle between paths 141 and 148 is $\phi$. The illustration of FIG. 16 assumes that the refractive indexes of the optical fiber waveguide 42 match the adjacent indexes along the path 148, so that the tapped light passes out from waveguide 42 in a substantially straight path. In practice, as described above, index matching fluid or a hard contact with a material such as YAG crystal is generally necessary to extract the tapped light from the cladding of the optical fiber waveguide 42.

Because of the low attenuation experienced by the acoustic signal as a result of the proper choice of material for use in substrate 46, the device of FIGS. 15 and 16 may utilize acoustic waves in the frequency range of approximately 1 GHz to deflect light by acousto-optic Bragg interaction. Since the device can be selectively tapped by merely turning the acoustic wave on or off, the device can be utilized for providing tapped optical signals for applications such as signal processing at a very high rate of speed. For example, if reflections in the system are reduced, a tap with a center frequency of 3 GHz will have a bandwidth of over 1 GHz, which implies that tap switching times of less than 1 ns are available. Thus, by application of an electrical signal to the transducer 144, in a manner well-known in the industry, the production of acoustic signals through transducer 144 may be switched at extremely high rates of speed to provide a very fast device for high-speed applications such as signal processing. In addition, the amount of light tapped from the system can also be controlled by simply varying the RF power supplied to the transducer 144.

6. Acousto-Optic Devices for Two-Mode Optical Fiber

Other preferred embodiments of the present invention include modal couplers and frequency shifters. The former may be useful for optical filtering and multichannel communication, while the latter is an essential element in heterodyned sensing applications, including the fiber gyroscope.

Before discussing the specific embodiments of the present invention as it relates to two-mode optical fiber, a detailed description of the optical waveguide and a brief summary of the applicable mode theory will be presented to provide background for more fully understanding the invention.

6a. Mode Theory

Although described below in connection with a silica glass optical fiber waveguide, one skilled in the art will understand that the concepts presented are also applicable to other optical waveguides, such as a $LiNbO_3$ optical fiber, integrated optics, or the like.

An exemplary cross-section of a silica glass optical fiber 150 is illustrated in FIG. 17. The fiber 150 comprises an inner core 152 and an outer cladding 154. The inner core 152 has a radius of r. In the exemplary fiber 150, the core has a refractive index $n_{co}$ and the cladding has a refractive index $n_{cl}$. As is well known in the art, the core refractive index $n_{co}$ is greater than the cladding index $n_{cl}$ so that an optical signal propagating in the optical fiber 150 is well-guided. The number of modes guided by the optical fiber 150 depends upon the fiber geometry and upon the wavelength of the optical signal propagating therethrough. Typically, the wavelength above which an optical fiber will propagate only the fundamental or first order mode is referred to as the "second order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405} \quad (4)$$

If the wavelength of the optical signal is greater than the wavelength $\lambda_c$ (i.e., the frequency of the optical signal is less than a cutoff frequency), only the first order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second order modes, will begin to propagate.

The true first and second order modes of a circular core optical fiber and their respective electric field amplitude distributions are illustrated in FIGS. 18a–18h. The two first order modes are the vertically polarized $HE_{11}$ mode represented by an electric field pattern 160 in FIG. 18a, and the horizontally polarized $HE_{11}$ mode, represented by an electric field pattern 162 in FIG. 18b. The outer circle in each figure represents the boundary of the core 152 of the fiber 150 of FIG. 17.

As illustrated in FIG. 18c, the $LP_{01}$ modes have an electric field amplitude distribution 166 that is substantially symmetrical around the center line of the core 152. The electric field amplitude distribution 166 is concentrated in the center of the core 152 and decreases as the distance from the center of the core 152 increases. A small portion of the electric field amplitude distribution 166 often extends beyond the boundaries of the core. This extended electric field is commonly referred to as the evanescent field of the guided modes.

The four true second order modes are illustrated in FIGS. 18d–18g. These four true modes are distinguished by the orientation of the transverse electric field, denoted by the directions of the arrows in FIGS. 18d–18g, and are commonly referred to as the $TE_{01}$ mode, represented by an electric field pattern 170 in FIG. 18d; the $TM_{01}$ mode, represented by an electric field pattern 172 in FIG. 18e; the $HE_{21}$ even mode, represented by an electric field pattern 174 in FIG. 18f; and the $HE_{21}$ odd mode, represented by an electric field pattern 176 in FIG. 18g.

An electric field amplitude distribution 180 for an exemplary optical signal propagating in the second order modes is illustrated in FIG. 18h. As illustrated, the electric field amplitude distribution 180 is substantially equal to zero at the central line of the core, and has two maximum amplitudes 182 and 184 near the boundary of the core. As further illustrated, the two amplitude maxima 182 and 184 are 180° out of phase. Further, a greater portion of the electric field distribution extends beyond the boundary of the core in the second order modes, thus providing a larger evanescent field than for the $HE_{11}$ modes.

Each of the four true second order modes has a slightly different propagation velocity from the other of the four second order modes. Thus, when two or more of the true second order modes are co-propagating in a two-mode fiber, the intensity distribution of the second order mode varies as a function of the length of the fiber as a result of changes in the phase differences between the four modes as they propagate. The cross-sectional intensity distribution of the second order mode changes in response to environmental changes that induce differential phase shifts between the almost degenerate four modes.

In order to more easily analyze the characteristics of optical signals propagating in the second order propagation modes, the characteristics of the modes are analyzed using the LP approximations for the modes defined and described in detail in D. Gloge, "Weakly Guiding Fibers," *Applied Optics*, Vol. 10, No. 10, Oct. 1971, pp. 2252–2258.

A better understanding of the mode theory of optical propagation in an optical fiber of other circular core waveguides can be obtained by referring to FIGS. 19a–19f, and wherein the first and second modes are represented in accordance with the LP approximations described by Gloge in his paper. The outer circles in each of the illustrations again represent the cross section of the core 152 of the optical fiber 150 of FIG. 17. The outlines within the core circles represent the electric field distributions. Arrows with the inner outlines represent the direction of polarization.

FIGS. 19a-19b show the field patterns of the two polarization modes in the fundamental $LP_{01}$ set of modes. A field pattern 190 in FIG. 19a represents vertically polarized light in the $LP_{01}$ fundamental mode, and a field pattern 192 in FIG. 19b represents horizontally polarized light in the fundamental $LP_{01}$ mode.

FIGS. 19c-19f illustrate the $LP_{11}$ approximations for the second order modes. As illustrated in FIGS. 19c-19f, there are four $LP_{11}$ modes, each having two lobes for the electric field distribution. Two of the modes, represented by an $LP_{11}$ mode pattern 200 in FIG. 19c and an $LP_{11}$ mode pattern 202 in FIG. 19d, are referred to herein as the $LP_{11}$ even modes. The other two $LP_{11}$ modes, represented by an $LP_{11}$ mode pattern 204 in FIG. 19e and an $LP_{11}$ mode pattern 206 in FIG. 19f, are referred to as the $LP_{11}$ odd modes. The four $LP_{11}$ modes are distinguished by the orientation of the lobe patterns and the orientation of the electric field vectors (i.e., the polarization vectors) within the lobe patterns. For example, the first $LP_{11}$ even mode field pattern 200 (FIG. 19c) has two lobes that are symmetrically located about a horizontal zero electric field line 210. Within the two lobes, the electric field vectors are parallel to and anti-symmetric about the zero electric field line 210. For convenience, the $LP_{11}$ mode represented by the lobe pattern 200 will be referred to as the horizontally polarized $LP_{11}$ even mode.

The second $LP_{11}$ even lobe pattern 202 (FIG. 19d) is symmetrically located about a horizontal zero electric field line 212. Within the two lobes of the field pattern 202, the electric field vectors are perpendicular to and anti-symmetric about the zero electric field line 212. The $LP_{11}$ mode represented by the electric field pattern 202 will be referred to as the vertically polarized $LP_{11}$ even mode.

The first $LP_{11}$ odd mode field pattern 204 has two lobes that are symmetrically located about a vertically oriented zero electric field line 214. Within the two lobes, the electric field vector is perpendicular to and anti-symmetric about the zero electric field line 214, and are thus oriented horizontally. The $LP_{11}$ mode represented by the field pattern 204 will thus be referred to as the horizontally polarized $LP_{11}$ odd mode.

The electric field pattern 206 of the second $LP_{11}$ odd mode has two lobes that are symmetrically located about a vertically oriented zero electric field line 216. Within the two lobes, the electric field vectors are parallel to and anti-symmetric about the zero electric field line 216. Thus, the $LP_{11}$ mode represented by the electric field pattern 206 will be referred to as the vertically polarized $LP_{11}$ odd mode.

In the LP-mode approximations, each of the six electric field patterns in FIGS. 19a-19f, namely, the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other.

If the indices of the core 152 and the cladding 154 of the optical fiber 150 are approximately equal, the two $LP_{01}$ modes will travel through the fiber at approximately the same propagation velocity, and the four second order $LP_{11}$ modes will travel through the fiber at approximately the same propagation velocity. However, the propagation velocity for the fundamental $LP_{01}$ set of modes will be slower than the propagation velocity for the second order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat wavelength of the fiber, which may be mathematically expressed as:

$$L_B = \frac{\lambda}{\Delta n} = \frac{2\pi}{\Delta \beta} \quad (5)$$

where $L_B$ is the beat wavelength, $\lambda$ is the optical wavelength in a vacuum, $\Delta n$ is the difference in the effective refractive indices of the two sets of modes, and $\Delta \beta$ is the difference in the propagation constants for the two sets of modes.

A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," OPTICS LETTERS, Vol. 11, No. 9, Sept. 1986, pp. 581-583; R. C. Youngquist, et al., "All-fiber components using periodic coupling," IEEE Proceedings, Vol. 132, Pt. J, No. 5, Oct. 1985, pp. 277-286; R. C. Youngquist, et al., "Two-mode fiber modal coupler," OPTICS LETTERS, Vol. 9, No. 5, May 1984, pp. 177-179; J. N. Blake, et al., "Fiber-optic modal coupler using periodic microbending," OPTICS LETTERS, Vol. 11, No. 3, Mar. 1986, pp. 177-179; B. Y. Kim, et al., "All-fiber acousto-optic frequency shifter," OPTICS LETTERS, Vol. 11, No. 6, June 1986, pp. 389-391; and J. N. Blake, et al., "All-fiber acousto-optic frequency shifter using two-mode fiber," Proceedings of the SPIE, Vol. 719, 1986. The present invention provides substantial improvement to many of those devices.

Although the four $LP_{11}$ modes provide four orthogonal channels for the propagation of optical energy through an optical fiber or other waveguide, it has often been found to be difficult to fully utilize the four channels independently. As set forth above, the $LP_{11}$ modes are approximations of real modes and are nearly degenerate in a circular core fiber 150. This makes the $LP_{11}$ modes very sensitive to couplings caused by perturbations in the optical fiber, such as bending, twisting and lateral stressing. Furthermore, since the $LP_{11}$ modes are only an approximation of the real modes, there will be a slight amount of coupling even in the absence of perturbations of the fiber 150. The net result is that the propagation of an $LP_{11}$ mode electric field pattern in a given mode is not stable. In like manner, the electric field patterns of te two $LP_{01}$ polarization modes are likewise unstable.

Figure 20:
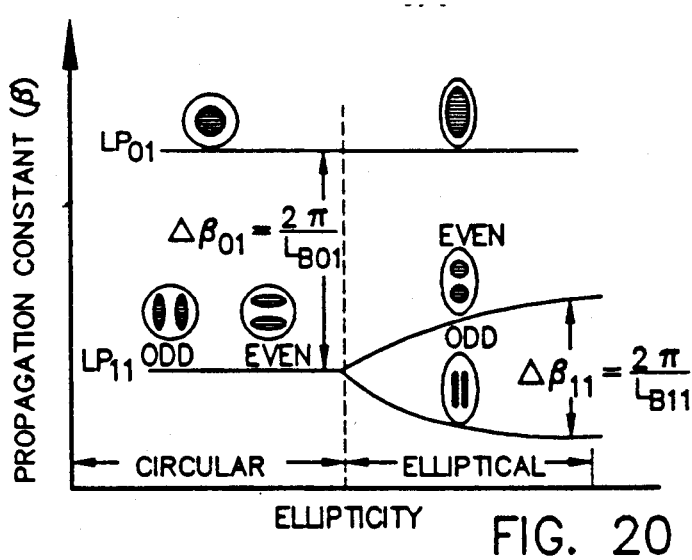
FIG. 20 is an unscaled graph of the propagation constant of an optical waveguide versus the ellipticity of the core of the optical waveguide.

It has been previously shown that the use of an elliptical core cross-section in an optical fiber or other waveguide can introduce birefringence and separate the propagation constants for the two polarizations of the $LP_{01}$ first order mode. The separation of the propagation constants locks the polarization of the signal to a principle axis of the core cross-section. It has also been shown that an elliptical core also increases the separation between the propagation constants of the $LP_{11}$ mode patterns. This tends to enhance modal stability. This is illustrated in FIG. 20 which is an unscaled representation of the propagation constant $\beta$ versus the ellipticity of the core of an optical waveguide. As illustrated, the $LP_{01}$ propagation mode has a larger propagation constant than the $LP_{11}$ propagation mode. From Equation (2), this difference in the propagation constants is related to the beat length $L_B$ between the $LP_{01}$ and $LP_{11}$ propagation modes as follows:

$$\Delta \beta_{01} = \frac{2\pi}{L_{B01}} \qquad (6)$$

where $\Delta \beta_{01}$ is the difference in the propagation constants between the $LP_{01}$ mode and the $LP_{11}$ mode and $L_{B01}$ is the beat length between the $LP_{01}$ and $LP_{11}$ modes.

As illustrated in the left-hand portion of FIG. 20, when the core of the optical waveguide is substantially circular, the $LP_{11}$ odd and even modes have substantially the same propagation constant. However, when the core of the optical waveguide is elliptical, the propagation constants of the odd and even $LP_{11}$ modes are different. This is illustrated by the propagation constant difference $\Delta \beta_{11}$ in the right half of FIG. 20. As illustrated, the difference in the propagation constants of the odd and even $LP_{11}$ modes ($\Delta \beta_{11}$) increases as the ellipticity increases. The use of an elliptical core optical fiber has been suggested as a means of avoiding the degeneracy of the orthogonal lobe orientations of the $LP_{11}$ modes. See, for example, J. N. Blake, et al., "All-fiber acousto-optic frequency shifter using two-mode fiber," *Proceedings of the SPIE*, Vol. 719, 1986.

The foregoing differences in the propagation constants between the $LP_{01}$ mode and the odd and even $LP_{11}$ modes when the core of the optical fiber is elliptical, also results in a change in the cutoff wavelength and the corresponding cutoff frequency. For example, for a circular core optical fiber, the cutoff wavelength is related to the radius of the fiber core, as set forth in Equation (1) above. Thus, optical signals having wavelengths above the second order mode cutoff wavelength $\lambda_c$ (i.e., frequencies below the second order mode cutoff frequency) will not propagate in the second order or higher modes in the optical fiber. Optical signals having wavelengths less than the cutoff wavelength $\lambda_c$ will propagate in the second order modes. If the wavelength is further reduced to a wavelength $\lambda_{c2}$, third order and higher modes will be supported by the optical waveguide. For a circular core optical waveguide, $\lambda_{c2}$ can be found by the following equation:

$$\lambda_{c2} = \frac{2\pi r \sqrt{n_{co}^2 - n_{cl}^2}}{3.832} \qquad (7)$$

where $r$, $n_{co}$ and $n_{cl}$ are as set forth above for Equation (1). One skilled in the art will understand that the foregoing can also be represented by cutoff frequencies. For example, the first cutoff wavelength $\lambda_c$ corresponds to a first cutoff frequency $f_c$, and the second cutoff wavelength $\lambda_{c2}$ corresponds to a second cutoff frequency $f_{c2}$ that is greater than the first cutoff frequency $f_c$.

Specifically, for the circular core optical waveguide, if the first cutoff frequency $f_c$ is normalized to 2.405, the second cutoff frequency $f_{c2}$ will be normalized to 3.832. In other words, the second cutoff frequency will be 1.59 times greater than the first cutoff frequency (e.g., $f_{c2}/f_c = 3.832/2.405 = 1.59$). Thus, an optical signal having a normalized frequency less than 2.405 will propagate in the optical waveguide only in the $LP_{01}$ mode. An optical signal having a normalized frequency in the rage of 2.405 to 3.832 will also propagate in the second order $LP_{11}$ mode. An optical signal having a normalized frequency greater than 3.832 will propagate in higher order modes.

The foregoing relationships also apply when the core of the optical waveguide is elliptical or has some other non-circular geometry. For example, Allan W. Snyder and Xue-Heng Zheng, in "Optical Fibers of Arbitrary Cross-Sections," *Journal of the Optical Society of America A*, Vol. 3, No. 5, May 1986, pp. 600–609, set forth the normalization factors for a number of different waveguide cross sections. For example, an elliptical core waveguide having a major axis that is twice the length of the minor axis, will have a normalized cutoff frequency $f_c$ of 1.889 when the minor axis has the same length as the diameter of a corresponding circular core optical fiber of the same material construction. In other words, below the normalized frequency of 1.889, only first order $LP_{01}$ modes will propagate. Similarly, Snyder and Zheng suggest that the $LP_{11}$ even mode will have a normalized cutoff frequency of 2.505, and the $LP_{11}$ odd mode will have a normalized cutoff frequency of 3.426.

Snyder and Zheng generalize the foregoing concept for an elliptical core optical waveguide with varying ratios between the length of the minor axis and the length of the major axis as follows:

$$f_c = 1.700 (1 + (b/a)^2)^{\frac{1}{2}} \qquad (8a)$$

$$f_{c2even} = 1.916 (1 + 3(b/a)^2)^{\frac{1}{2}} \qquad (8b)$$

$$f_{c2odd} = 1.916 (3 + (b/a)^2)^{\frac{1}{2}} \qquad (8c)$$

where $f_c$ is the normalized cutoff frequency for the $LP_{01}$ mode, below which optical energy will propagate only in the $LP_{01}$ mode in the elliptical core optical fiber; where $f_{c2even}$ mode is the normalized cutoff frequency for optical energy propagating the $LP_{11}$ even mode, below which optical energy will propagate only in the $LP_{11}$ even mode but not in the $LP_{11}$ odd mode; and where $f_{c2odd}$ is the normalized cutoff frequency for the $LP_{11}$ odd mode, below which optical energy will propagate in the $LP_{11}$ odd mode as well as the $LP_{11}$ even mode, but not in any of the higher order modes; b is one-half the length of the minor axis of the elliptical core; and a is one-half the length of the major axis of the elliptical core. Equations (8a), (8b) and (8c) can be evaluated for an elliptical core fiber having a major axis length 2a of twice the minor axis length 2b to obtain the normalized frequencies 1.889, 2.505 and 3.426, set forth above. Equations (8a), (8b) and (8c) can be further evaluated for b=a (i.e., for a circular core) to obtain the $LP_{01}$ cutoff frequency of 2.405 and the $LP_{11}$ cutoff frequency of 3.832 for both the odd and even modes, as set forth above.

The foregoing properties of the elliptical core optical waveguide are advantageously utilized in the present invention to improve the operating characteristics of the optical waveguide by eliminating the $LP_{11}$ odd propagation mode and thus providing only one spatial orientation for the electric field pattern of the second order mode. This is illustrated in FIGS. 21 and 22a–22g.

Figure 21:
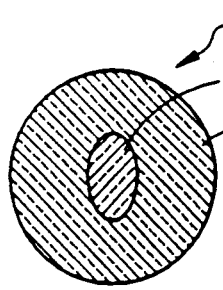
FIG. 21 is a cross-sectional view of an exemplary optical fiber of the present invention having a highly elliptical core.

FIG. 21 illustrates an exemplary optical fiber 250 having an elliptical core 252 and a surrounding cladding 254. The dimensions of the elliptical core 252 are selected so that the cutoff wavelengths and frequencies for the two orthogonal lobe patterns of the second order mode are well separated. An optical signal is applied to the fiber 250 that is within a frequency range selected to be above the cutoff frequency $f_{c2even}$ and to be below the cutoff frequency $f_{c2odd}$. For example, in an exemplary optical fiber, having a first cutoff frequency $f_c$ that is normalized to 1.889, and second frequency $f_{c2even}$ of 2.505, the frequency of the input optical signal is selected to have a normalized frequency in the range of 1.889 to 2.505. Thus, a light source is selected so that substantially all of the light produced by the light source has a normalized frequency that is substantially less than the second cutoff frequency $f_{c2even}$, and that has a substantial portion of the light that has a normalized frequency that is greater than the first cutoff frequency $f_c$. In terms of wavelength, substantially all of the light produced by the light source has one of more wavelengths that are greater than the second cutoff wavelength $\lambda_{c2even}$, and wherein a substantial portion of the light has at least one wavelength that is less than the first cutoff wavelength $\lambda_c$. Thus, the light entering the optical fiber is caused to propagate only in either the first order $LP_{01}$ mode or the $LP_{11}$ even mode. Since the frequency of the optical signal is selected to be less than the cutoff wavelength for the $LP_{11}$ odd mode, substantially no light propagates in the $LP_{11}$ odd mode.

Figure 22A:
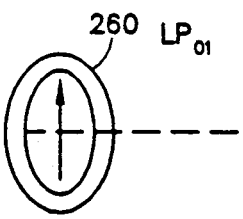
FIGS. 22a and 22b illustrate the electrical field intensity patterns for the $LP_{01}$ (fundamental) propagation modes of the elliptical core optical fiber of FIG. 21.
Figure 22B:
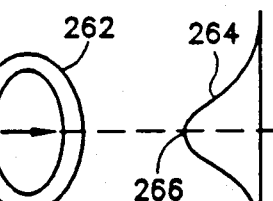
Figure 22C:
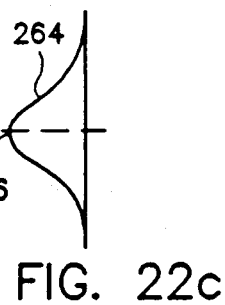
FIG. 22c is a graph of the electric field amplitude distribution for the $LP_{01}$ propagation mode of the elliptical core optical fiber of FIG. 21.

The foregoing is illustrated in FIGS. 22a-22g. In FIGS. 22a and 22b, the two polarization modes for the $LP_{01}$, first order mode are illustrated. An electric field pattern 260 in FIG. 22a represents the electric field for the vertically polarized $LP_{01}$ mode, and an electric field pattern 262 in FIG. 22b represents the electric field for the horizontally polarized $LP_{01}$ mode. One skilled in the art will understand that the optical fiber 250 (FIG. 21) is birefringent for the first order $LP_{01}$ mode, and that the horizontally polarized $LP_{01}$ mode will propagate at a greater velocity than the vertically polarized $LP_{01}$ mode. An electric field amplitude distribution 264 for the $LP_{01}$ propagation modes is illustrated in FIG. 22c. As illustrated, the electric field amplitude distribution 264 is similar to the electric field amplitude distribution 166 in FIG. 18c, for a circular core fiber and has a peak amplitude 266 proximate to the center line of the core 252.

Figures 22D, 22E:
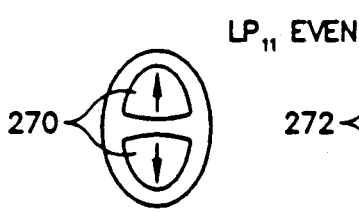
FIGS. 22d and 22e illustrate the electric field intensity patterns for the even $LP_{11}$ propagation modes of the elliptical core optical fiber of FIG. 21.
Figure 22F:
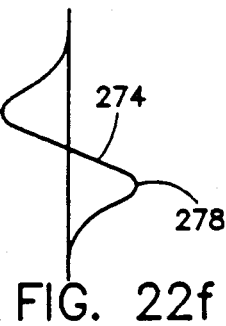
FIG. 22f is a graph of the electric field amplitude distribution for the even $LP_{11}$ propagation modes of the elliptical core optical fiber of FIG. 21.
Figure 22G:
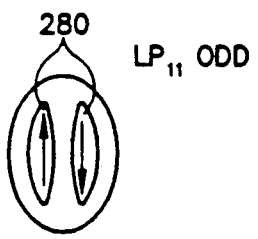
FIGS. 22g and 22h illustrate the electric field intensity patterns for the odd $LP_{11}$ propagation modes of the elliptical core optical fiber of FIG. 21.
Figure 22H:
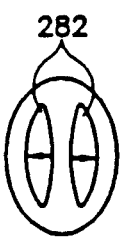

FIGS. 22d and 22e illustrate the $LP_{11}$ even modes for the elliptical core fiber 250. As illustrated in FIG. 22d and FIG. 22e, respectively, a vertically polarized even mode electric field pattern 270 and a horizontally polarized even mode electric field pattern 272 are both well-guided by the optical fiber 250. As illustrated in FIG. 22f, the $LP_{11}$ even modes have an electric field amplitude distribution, represented by a curve 274, that has a first maxima 276 proximate to one boundary of the core, and that has a second maxima 278 proximate to an opposite boundary of the core, and wherein the first maxima 276 and the second maxima 278 are 180° out of phase.

The $LP_{11}$ odd vertical polarization mode, represented by an electric field pattern 280 (FIG. 22f), and the $LP_{11}$ odd horizontal polarization mode, represented by an electric field pattern 282 (FIG. 22g), are not guided by the optical fiber 250 when the optical wavelength is selected to be above the second cutoff wavelength $\lambda_{c2even}$. Thus, the optical energy in the $LP_{11}$ odd modes, represented by the field patterns 280 and 282, will not propagate. Thus, rather than providing four degenerate optical communication channels, such as provided by a circular core waveguide or a slightly elliptical core waveguide, the highly elliptical core 252 of the optical fiber 250 provides only two $LP_{01}$ mode propagation channels and two $LP_{11}$ even mode propagation channels. Furthermore, the communication channels are well-defined and stable and, in the absence of a perturbation in the optical fiber 250, there is no coupling between any of the four channels. Therefore, an optical signal can be launched in the second order $LP_{11}$ mode and it will propagate only in the $LP_{11}$ even mode. It is not necessary to avoid exciting the odd lobe patterns of the second order $LP_{11}$ mode because optical energy in those lobe patterns will not propagate. Furthermore, optical energy will not be coupled to the odd lobe patterns.

6b. Frequency Shifter/Mode Coupler for Two-Mode Optical Fiber

The frequency shifter and modal couplers of the present invention are designed to couple between the two lowest order spatial modes of an elliptical core fiber (the $LP_{01}$ and $LP_{11}$ modes) as illustrated in FIG. 22. Elliptical core fiber is preferably used because it ensures truly two-mode propagation at wavelengths slightly below the cut-off wavelength of the fundamental mode. A strain wave $S(r,t)$ traveling through the core region 252 (FIG. 21) causes a refractive index change proportional to the strain field as a result of the acousto-optic effect, described previously in connection with Equation 1. Thus, an electric field $E(r,t)$ present in the optical fiber waveguide 250 (FIG. 21) induces a polarization field $\Delta P(r,t)$ in the fiber of the form:

$$\Delta P(r,t) = \Delta\epsilon(r,t)\, E(r,t) \propto S(r,t)\, E(r,t) \qquad (9)$$

Figure 23A:
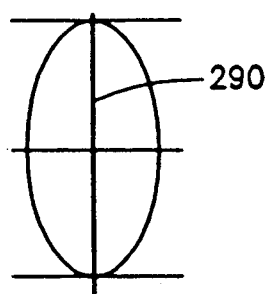
FIG. 23a illustrates the electric field intensity pattern for an acoustic wave having a wavelength nearly equal to the core diameter of the elliptical core optical fiber of FIG. 21.
Figure 23B:
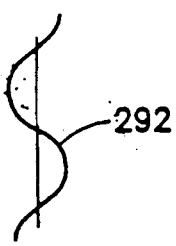
FIG. 23b is a graph of the electric field amplitude distribution for the $LP_{01}$ propagation mode when the asymmetric strain field produced by the acoustic wave is multiplied by the fundamental mode field in the elliptical core optical fiber of FIG. 21.

If $E(r,t)$ is the fundamental mode field, then $\Delta P(r,t)$ will efficiently couple to the second-order mode if two conditions are met. First, $\Delta P$ must overlap with the excited mode field; and secondly, phase-matching must exist between $\Delta P$ and the excited mode field. FIG. 23a illustrates an acoustic wave wavelength at 290 which is nearly equal to the core diameter of the core 252 (FIG. 21) of elliptical fiber 250. Such an acoustic wave produces an asymmetric strain field which, when multiplied by the fundamental mode field ($LP_{01}$), approximates the second-order mode field ($LP_{11}$), as indicated by the waveform 292 illustrated in FIG. 23b. In one preferred embodiment of the invention, constructed for evaluation purposes, the above-indicated conditions were met for an elliptical core fiber at an acoustic frequency of 1.05 GHz.

The above-mentioned phase-matching condition arises because the two modes have different phase velocities, as was discussed previously. Thus, at a given optical frequency $\omega_0$, the modes will have propagation constants $\beta_0$ and $\beta_1$. Assume that the initial mode field is described as:

$$E(r,t) = E(x,y)\exp\{j(\omega_0 t - \beta_0 z)\} \qquad (10)$$

Figure 24:
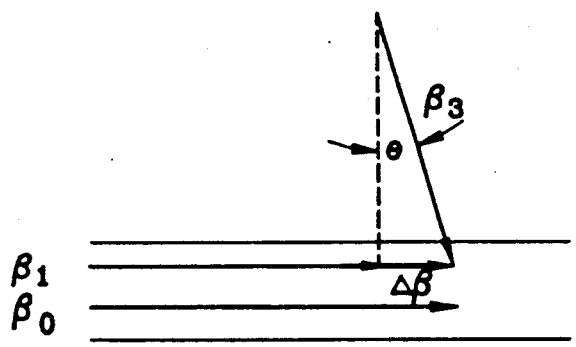
FIG. 24 is a graph illustrating the phase velocities at a given optical frequency of the $LP_{01}$ and $LP_{11}$ modes of the elliptical core optical fiber of FIG. 21, and showing the angle at which the acoustic wave must be launched with respect to the fiber access in order to achieve an initial phase-matching of the strain wave with the optical modes.

With the initial mode field as shown in Equation 10, the phase-matching condition requires the strain wave to have a propagation constant in the z-direction (parallel to the optical fiber core 252) equal to the difference $\Delta\beta = \beta_0 - \beta_1$. This is most easily satisfied by launching the acoustic wave at an angle $\theta$ with respect to the normal to the axis, as illustrated in FIG. 24. For the embodiment of the system constructed for evaluation, using the acoustic frequency of 1.05 GHz, the required angle ($\theta$) was 1.53°. Thus, the strain wave is described as follows:

$$S(r,t) = S(y)\exp\{[(\omega_s t - \beta_y x\cos(1.53°) - \beta_y z\sin(1.53°)]\} \quad (11)$$

where $\Delta\beta = \beta_S\sin(1.53°)$.

It is noted that the polarization field, and the coupled mode, are shifted in frequency with respect to the optical carrier. If the acoustic wave has components in both the forward and backward directions, both sidebands will be excited, but single-sideband coupling results if only one component is present.

In order to produce a similar single-sideband couple using the all-fiber device technology, one must pattern a transducer array with at least three electrical contacts for proper phasing in order to excite the unidirectional z-propagation. However, the device of the present invention, using the grooved substrate, is ideal for such an application. The angular relationship required to excite the unidirectional z-propagation in the device of the present invention is achieved by polishing the outer face 48 of the substrate to define an angle with respect to the groove, as illustrated in the device of FIG. 14.

In accordance with the relationships described above, one preferred embodiment of the device was produced by polishing the outer face 48 to produce an angle of 1.53° with respect to the groove 34. A transducer 144 was then deposited on this outer face 48. The transducer was identical to the configuration of the transducer previously described in connection with the phase modulator, measuring 80 µm by 4 mm, except that a 3.0 µm thick ZnO film was deposited to produce a center frequency of 1.05 GHz.

Testing of the above-described device was accomplished by use of light from an argon ion laser at 514.5 nm, which was coupled into an elliptical fiber such as that illustrated at 250 in FIG. 21. The fiber 250 was squeezed into the groove 34 of the modulator 140 of FIG. 14, through use of an optical flat in a press of the type illustrated in FIGS. 6-8. The major axis of the elliptical core is aligned parallel to the acoustic propagation direction by polarizing the light into the vertical $LP_{01}$ mode and observing the scattered radiation. The scattering pattern has a mill in the direction parallel to the polarization; thus, by aligning this direction of minimum scattering with the acoustic wave, maximum coupling is achieved. Vacuum grease was introduced between the surface of the groove 34 and the optical fiber 250 to enhance the acoustic coupling. A second-order mode stripper consisting of several turns of fiber on a 0.25 inch mandrel was used to ensure propagation of only the fundamental mode. A knife edge was used to remove one lobe of the second-order mode upon output and the light was focused onto a high-speed photodiode. This output light was heterodyned with a reference beam, frequency shifted by 40 MHz by an external Bragg cell. This served two purposes. First, the external frequency shift allowed separation of the upper and lower sidebands. Also, the strong reference beam served as a local oscillator so that the field amplitude would be measured rather than intensity, allowing detection and measurement of very weak signals.

Figure 25:
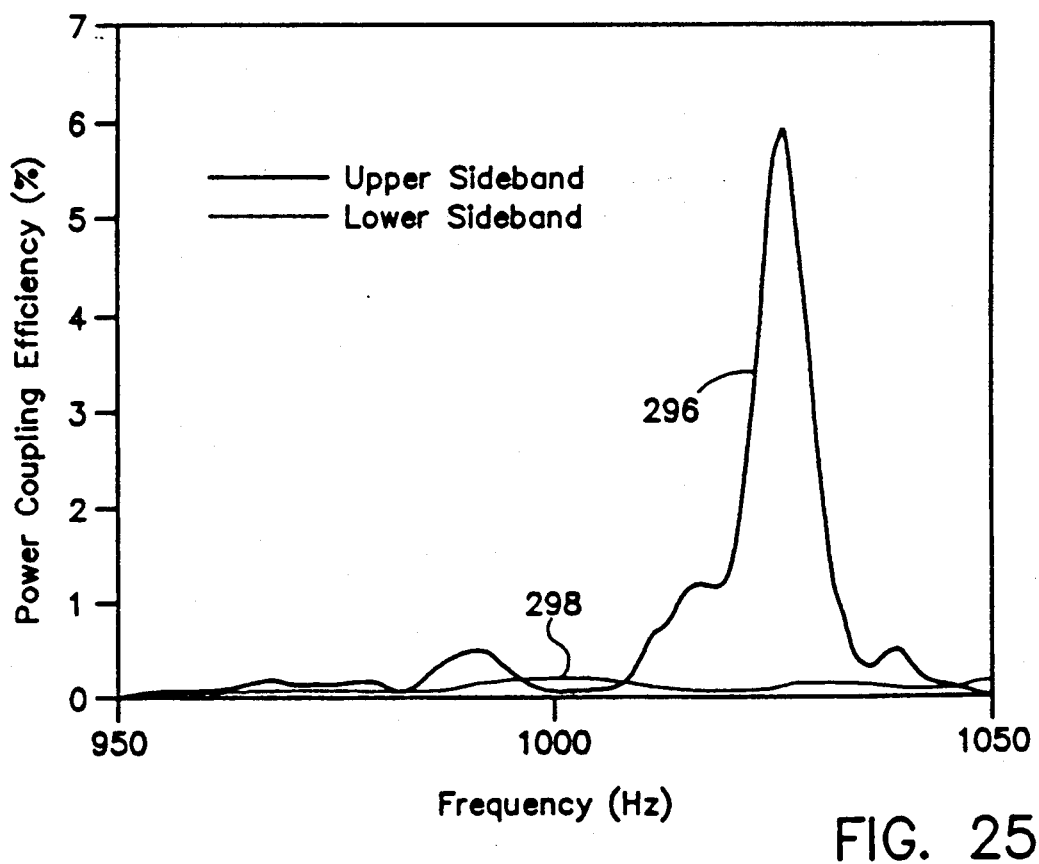
FIG. 25 is a graphical illustration of power coupling efficiency as a function of acoustic frequency in the elliptical fiber for both sidebands at 500 mW input electrical power.

FIG. 25 is an illustration of the power coupling versus frequency for the above-described device, plotted at a value of 500 mW input power (CW) for both the upper and lower sidebands, represented by trace lines 296 and 298, respectively. The graph illustrates sideband suppression of >19 dB. Because the signal level of the lower sideband was below the level of electromagnetic interference, the actual suppression may have been much better. The power coupling was linear with applied power, as expected, up to the measured 500 mW CW power. By increasing the interaction length, one might expect to improve this efficiency. Because the beat length, the length over which the two modes dephase by $2\pi$ (defined by $L_{beat} = 2\pi/\Delta\beta$) was 0.2 mm, one would expect a fractional bandwidth of:

$$\Delta f/f_0 = 0.2\text{mm}/4\text{mm} = 5\% \quad (12)$$

The 6% coupling efficiency is remarkably close to the theoretical 7% coupling expected from a traveling acoustic wave excited by 500 mW input power.

The device of the present invention also finds application in mode-locking a fiber laser, eliminating all external cavity components and, hence, any etalon effects. The narrow bandwidth of the device is not detrimental to this application, as mode-locking requires only a CW modulation. The mode coupler may be used as a frequency shifter, or as an optical band-reject filter, using the dependence of beatlength upon optical frequency.

In summary, not only does the invention described herein comprise a significant improvement over the prior art in the general modulator technology, but it also overcomes other long existent problems in fiber-optic systems by: (1) providing a means by which an acoustic-optic modulator device may be fabricated separate from a waveguide, while being removably attachable to the waveguide in a manner which does not interrupt or degrade system operations; (2) providing such a modulator device which lends itself to standard photolithographic techniques for fabrication of a transducer on a substrate; (3) providing such a modulator device which additionally lends itself to fabrication of transducers oriented at an angle with respect to the waveguide, to permit use of the device for applications in which an acoustic wave component is desired in the direction of optical propagation; and (4) providing such a modulator device which finds use in numerous applications such as phase modulation, tapping of light into and out of optical fiber waveguides; two-mode frequency shifters and mode couplers; and for use in mode-locking a fiber laser.

In addition to overcoming these problems, the present invention provides a fabrication process which comprises a great step forward in the simplification of construction of such devices. Thus, the present invention is economical to produce, in addition to comprising an important improvement in providing efficient and versatile acousto-optic modulator devices for use in optical systems.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An acousto-optic device comprising:
   an optical waveguide for propagating light along a
      first optical path wherein a portion of a surface of said optical waveguide defines a substantially curved configuration along at least a portion of the length of said waveguide;

a portion of a capillary configured so as to define a groove along a portion of its length, wherein a portion of the curved surface of the optical waveguide is secured about a portion of the curve and along a portion of the waveguide's length in Hertzian contact with a portion of the groove; and an acoustic transducer secured upon the capillary so as to generate acoustic waves for propagation through an acoustic path extending from said transducer through said capillary and then through the optical waveguide into said first optical path, with the acoustic path between said capillary and said optical waveguide being formed entirely of solid material, thereby producing interaction between the acoustic waves and light traveling along the first optical path.

2. An acousto-optic device as defined in claim 1, wherein a portion of the capillary defines a semi-circular external surface configuration.

3. An acousto-optic device as defined in claim 1, wherein an external surface of the capillary which is substantially opposite to the surface containing the groove defines a substantially flat surface which is substantially parallel to the plane of said groove.

4. An acousto-optic device as defined in claim 3, wherein the transducer is positioned on the substantially flat surface of the capillary.

5. An acousto-optic device as defined in claim 1, further comprising an acoustically conductive material interposed between the groove and the waveguide such that acoustic contact between the groove and the waveguide is accomplished along a substantial portion of the region in which the groove and the waveguide are adjacent each other.

6. An acousto-optic device as defined in claim 1, wherein the waveguide comprises a single mode optical fiber, and wherein the device comprises a phase modulator for modulating phase of light traveling along the optical path in the waveguide.

7. An acousto-optic device as defined in claim 1, wherein an external surface of the capillary which is substantially opposite to the surface containing the groove defines a substantially flat surface which is angularly oriented with respect to the plane of said groove.

8. An acousto-optic device as defined in claim 7, wherein the waveguide comprises a single mode optical fiber, and wherein the device comprises an optical tap for transmitting acoustic waves into the waveguide along an acoustic path which intersects the first optical path at an angle selected to cause said light to be deflected from said first optical path along a second optical path.

9. An acousto-optic device as defined in claim 8, wherein a portion of a surface of the capillary is polished to define an optical window, and wherein light deflected from the waveguide passes through the capillary and out of the optical window.

10. An acousto-optic device as defined in claim 8, wherein the single mode optical fiber comprise a core and a cladding and wherein the first optical path is within said core and wherein the second optical path is within said cladding.

11. An acousto-optic device as defined in claim 7, wherein the waveguide comprises a multi-mode optical fiber having at least first and second modes available for transmission of light therein along the first optical path, and wherein the device comprises a frequency shifter for transmitting acoustic waves into the waveguide along an acoustic path which intersects the first optical path at an angle selected to cause light traveling in at least one of the first and second modes along said first optical path to be frequency shifted.

12. An acousto-optic device as defined in claim 11, wherein the multi-mode optical fiber comprises an elliptical core fiber.

13. An acousto-optic device as defined in claim 7, wherein the waveguide comprises a multi-mode optical fiber having at least first and second modes available for transmission of light therein along the first optical path, and wherein the device comprises a mode coupler for transmitting acoustic waves into the waveguide along an acoustic path which intersects the first optical path at an angle selected to cause light traveling in at least one of the first and second modes along said first optical path to be coupled into the other of said first and second modes.

14. An acousto-optic device as defined in claim 13, wherein the multi-mode optical fiber comprises an elliptical core fiber.

15. An acousto-optic device as defined in claim 1, wherein the acoustic transducer comprises an interdigital transducer.

16. An acousto-optic device as defined in claim 1, wherein the acoustic transducer comprises a Fresnel lens.

17. An acousto-optic device as defined in claim 1, wherein the capillary comprises an acoustic transmission medium.

18. An acousto-optic device as defined in claim 17, wherein the acoustic transmission medium is glass.

19. An acousto-optic device comprising:

an optical waveguide for propagating light along a first optical path wherein a portion of a surface of said optical waveguide defines a substantially curved configuration along at least a portion of the length of said waveguide;

an acoustic transmission member having a groove extending along a portion of its length, wherein a portion of the curved surface of the optical waveguide is secured in Hertzian contact with the groove about a portion of the curve and along a continuous portion of the waveguide's length; and an acoustic transducer secured upon the acoustic transmission member so as to generate acoustic waves for propagation through an acoustic path extending from the transducer through said acoustic transmission member and through the Hertzian contact area into said first optical path, with the acoustic path through said Hertzian contact area being formed entirely of solid material, thereby producing interaction between the acoustic waves and light traveling along the first optical path.

20. An acousto-optic device as defined in claim 19, wherein the acoustic transmission member comprises a portion of a capillary configured so as to define said groove along a portion of its length.

21. an acousto-optic phase modulator comprising:

a single mode optical fiber for propagating light along a first optical path;

a portion of a capillary configured so as to define a groove along a portion of its length, wherein a portion of the single mode optical fiber is secured in Hertzian contact with a portion of the groove; and an acoustic transducer secured upon the capillary so as to generate acoustic waves for propagation through an acoustic path extending from said transducer through said capillary and then through the optical waveguide into said first optical path, with the acoustic path between said capillary and said optical waveguide being formed entirely of solid material, thereby producing interaction between the acoustic waves and light traveling along the first optical path, so as to modulate phase of light traveling along the optical path in the waveguide.

22. An acousto-optic frequency shifter comprising:
a multi-mode optical fiber having at least first and second modes available for transmission of light therein along a first optical path;
a portion of a capillary configured so as to define a groove along a portion of its length, and having an external surface which is substantially opposite to the surface containing the groove, and which defines a substantially flat surface that is angularly oriented with respect to the plane of said groove, and wherein a portion of the multi-mode optical fiber is secured in Hertzian contact with a portion of the groove; and
an acoustic transducer secured upon the capillary so as to transmit acoustic waves from said transducer through said capillary and into the waveguide along an acoustic path which, between said capillary and said waiveguide, is formed entirely of solid material and which intersects the first optical path at an angle selected to cause light traveling in at least one of the first and second modes along said first optical path to be frequency shifted.

23. An acousto-optic device as defined in claim 22, wherein the multi-mode optical fiber comprises an elliptical core fiber.

24. An acousto-optic mode coupler comprising:
a multi-mode optical fiber having at least first and second modes available for transmission of light therein along a first optical path;
a portion of a capillary configured so as to define a groove along a portion of its length, and having an external surface which is substantially opposite to the surface containing the groove, and which defines a substantially flat surface that is angularly oriented with respect to the plane of said groove, and wherein a portion of the multi-mode optical fiber is secured in Hertzian contact with a portion of the groove; and
an acoustic transducer secured upon the capillary so as to transmit acoustic waves from said transducer through said capillary and into the waveguide along an acoustic path which, between said capillary and said waveguide, is formed entirely of solid material and which intersects the first optical path at an angle selected to cause light traveling in at least one of the first and second modes along said first optical path to be coupled into the other of said first and second modes.

25. An acousto-optic device as defined in claim 24, wherein the multi-mode optical fiber comprises an elliptical core fiber.

* * * * *

UNITED STATES PATENT AND TRADEMARK OFFICE
CERTIFICATE OF CORRECTION

PATENT NO.   : 4,991,923

DATED        : February 12 1991

INVENTOR(S)  : Kino et al

It is certified that error appears in the above-identified patent and that said Letters Patent is hereby corrected as shown below:

Column 8, Line 55, change "h2" to ---+h2--.

Move Columns 23 and 24 to follow Column 22.

Signed and Sealed this

Seventeenth Day of March, 1992

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,991,923
DATED : February 12, 1991
INVENTOR(S) : Kino, et al

It is certified that error appears in the above-indentified patent and that said Letters Patent is hereby corrected as shown below:

Column 1, line 5, insert the following:

--This invention was made with Government support under contract N00014-87-K-0337 awarded by the Office of Naval Research. The Government has certain rights in this invention.--.

Signed and Sealed this

Twenty-eighth Day of September, 1993

*Attest:*

BRUCE LEHMAN

*Attesting Officer*   *Commissioner of Patents and Trademarks*